US012473821B2

(12) United States Patent
Steimetz

(10) Patent No.: US 12,473,821 B2
(45) Date of Patent: Nov. 18, 2025

(54) PRE-LOADED BEARINGS FOR SENSOR SHELL

(71) Applicant: Schlumberger Technology Corporation, Sugar Land, TX (US)

(72) Inventor: Julien Steimetz, Bristol (GB)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 674 days.

(21) Appl. No.: 17/995,485

(22) PCT Filed: Apr. 1, 2021

(86) PCT No.: PCT/US2021/025338
§ 371 (c)(1),
(2) Date: Oct. 5, 2022

(87) PCT Pub. No.: WO2021/206991
PCT Pub. Date: Oct. 14, 2021

(65) Prior Publication Data

US 2023/0175389 A1 Jun. 8, 2023

(30) Foreign Application Priority Data

Apr. 6, 2020 (GB) ..................................... 2005056

(51) Int. Cl.
*G01C 19/38* (2006.01)
*E21B 47/013* (2012.01)
(Continued)

(52) U.S. Cl.
CPC ........ *E21B 47/0224* (2020.05); *E21B 47/013* (2020.05); *E21B 47/024* (2013.01); *G01C 19/38* (2013.01)

(58) Field of Classification Search
CPC .. E21B 47/0224; E21B 47/013; E21B 47/024; E21B 47/022; E21B 47/02; G01C 19/38
See application file for complete search history.

(56) References Cited

U.S. PATENT DOCUMENTS 2,857,677 A 10/1958 Norden
4,197,654 A 4/1980 Van Steenwyk et al.
(Continued)

FOREIGN PATENT DOCUMENTS

EP 2068118 A1 * 6/2009 ............. G01C 19/56
EP 2604973 A1 6/2013
(Continued)

OTHER PUBLICATIONS

International Search Report and Written Opinion in International Patent Application No. PCT/US2021/025338, dated Aug. 6, 2021, 7 pages.
(Continued)

*Primary Examiner* — Yaritza Guadalupe-McCall
(74) *Attorney, Agent, or Firm* — Jeffrey D. Frantz

(57) ABSTRACT

Devices, systems, and methods for stabilizing a gyroscopic sensor include bearings supporting a MEMS-type gyroscope located in a shell. The shell rotates around a secondary shaft connected to an extension arm of a primary shaft. A biasing element pre-loads thrust bearings on either side of the shell against the extension arm, which can limit motion of the shell during operation of the sensor, thereby improving measurements made by the sensor.

19 Claims, 12 Drawing Sheets

(51) Int. Cl.
*E21B 47/0224* (2012.01)
*E21B 47/024* (2006.01)

(56) References Cited

U.S. PATENT DOCUMENTS

| | | | | | |
|---|---|---|---|---|---|
| 4,231,252 | A | * | 11/1980 | Cherkson | E21B 47/024 33/313 |
| 6,082,907 | A | * | 7/2000 | Arvidsson | F16C 19/36 384/563 |
| 11,898,432 | B2 | * | 2/2024 | Whitmore | E21B 7/06 |
| 12,025,005 | B2 | * | 7/2024 | Xu | E21B 7/062 |
| 12,134,967 | B2 | * | 11/2024 | Katayama | E21B 47/0236 |
| 12,234,722 | B2 | * | 2/2025 | Hough | E21B 17/028 |
| 2009/0119937 | A1 | | 5/2009 | Watson | |
| 2010/0077623 | A1 | | 4/2010 | Imamura et al. | |
| 2010/0198518 | A1 | * | 8/2010 | Ekseth | E21B 47/022 702/6 |
| 2011/0197460 | A1 | | 8/2011 | Magosaki | |
| 2013/0118731 | A1 | | 5/2013 | Parfitt | |
| 2017/0306747 | A1 | * | 10/2017 | Parfitt | E21B 41/00 |
| 2018/0119545 | A1 | * | 5/2018 | Clark | E21B 47/0228 |
| 2020/0132458 | A1 | * | 4/2020 | Johnson | G01C 19/5783 |
| 2023/0175389 | A1 | * | 6/2023 | Steimetz | E21B 47/0224 175/45 |

FOREIGN PATENT DOCUMENTS

| | | | | | |
|---|---|---|---|---|---|
| FR | 2170216 | A1 | | 9/1973 | |
| GB | 733024 | A | | 7/1955 | |
| WO | WO-2011146988 | A1 | * | 12/2011 | E21B 17/028 |
| WO | WO-2024076622 | A1 | * | 4/2024 | E21B 44/005 |

OTHER PUBLICATIONS

Combined Search and Examination Report under Section 17 and 18(3) in GB Patent Application No. GB2005056.3, dated Dec. 22, 2020, 12 pages.

* cited by examiner

PRE-LOADED BEARINGS FOR SENSOR SHELL

CROSS-REFERENCE TO RELATED APPLICATIONS

This application claims the benefit of, and priority to, U.K. Patent Application No. 2005056.3, filed Apr. 6, 2020, and titled "Pre-Loaded Bearings for Sensor Shell", which application is expressly incorporated herein by this reference in its entirety.

BACKGROUND

Modern drilling operations may change the trajectory of a wellbore through the process of directional drilling. While drilling, it may become necessary to determine the location and/or trajectory of the bit. Survey instruments located on a downhole tool may be used to measure azimuth, inclination, and other survey information. At least one survey instrument may include a MEMS (Micro-ElectroMechanical Systems)-type gyroscope. The MEMS-type gyroscope may be located on a downhole tool, such as at a bottomhole assembly ("BHA").

SUMMARY

In some embodiments, a sensor support apparatus includes a shell configured to encompass a MEMS-type gyroscope. A secondary shaft is connected to a connection arm of a primary shaft and extends through the shell. One or more bearings support rotation of the shell. The apparatus further includes a means for pre-loading the one or more bearings.

In some embodiments, a system for supporting a sensor includes a shell configured to encompass a MEMS-type gyroscope. A secondary shaft is connected to a connection arm of a primary shaft and extends through the shell. A secondary shaft bearing includes a first shell bearing between the shell the connection arm. A second shell bearing is located between a retaining member and the shell. A biasing element exerts a secondary loading force between the retaining member and the second shell bearing. In some embodiments, a shell bearing may include a shell pad at least partially complementary to an outer surface of the shell and support rotation of the shell.

In some embodiments, a method for assembling a sensor includes providing a MEMS-type gyroscope in a shell. A secondary shaft is extended through the shell. The secondary shaft is rigidly connected to a connection arm on a primary shaft and through a first shell bearing and a second shell bearing. The first shell bearing and the second shell bearing are pre-loaded with a biasing element.

This summary is provided to introduce a selection of concepts that are further described in the detailed description. This summary is not intended to identify key or essential features of the claimed subject matter, nor is it intended to be used as an aid in limiting the scope of the claimed subject matter. Additional features and aspects of embodiments of the disclosure will be set forth herein, and in part will be obvious from the description, or may be learned by the practice of such embodiments.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which:

FIG. 6-1 through FIG. 6-4 are representations of schematic views of a system for supporting a sensor, according to at least one embodiment of the present disclosure;

FIG. 7-1 is a representation of a perspective view of yet another system for supporting a sensor, according to at least one embodiment of the present disclosure;

FIG. 7-2 is a representation of the seat bearing of FIG. 7-1;

DETAILED DESCRIPTION

This disclosure generally relates to devices, systems, and methods for stabilizing a gyroscopic sensor. Bearings support multi-axis rotation of a MEMS-type gyroscope located in a shell. The shell rotates around a secondary shaft connected to an extension arm of a primary shaft. A biasing element pre-loads thrust bearings on either side of the shell against the extension arm, in at least one embodiment. This takes up space in the bearings to limit the amount of motion of the shell during operation of the sensor, thereby improving measurements made by the sensor.

The present disclosure includes a number of practical applications that provide benefits and/or solve problems associated with downhole drilling sensors. In at least one embodiment, as will be discussed in further detail herein, apparatuses, systems, and methods disclosed herein may reduce error-inducing movement from rotating downhole MEMS-type gyroscopic sensor. For instance, applying a compressive force against a shell housing the MEMS-type gyroscopic sensor may take up slack in its supporting thrust bearings. This may reduce axial motion of the shell, thereby improving measurements made by the MEMS-type gyroscopic sensor, in at least one embodiment.

In at least one embodiment, a primary shaft may be supported by a plurality of angular contact bearings. Applying a longitudinal force to the angular contact bearings, rotation of the primary shaft may pre-load the angular contact bearings. This may reduce any axial runout or wobble of the primary shaft. In this manner, the primary shaft may transfer rotational motion to the shell of the MEMS-type gyroscopic sensor that is more closely aligned with the longitudinal axis of the primary shaft. This may reduce wobble, eccentricity, or other motion transferred to the shell from the primary shaft. This may improve the accuracy of measurements collected by the MEMS-type gyroscopic sensor, in at least one embodiment.

Figure 1:
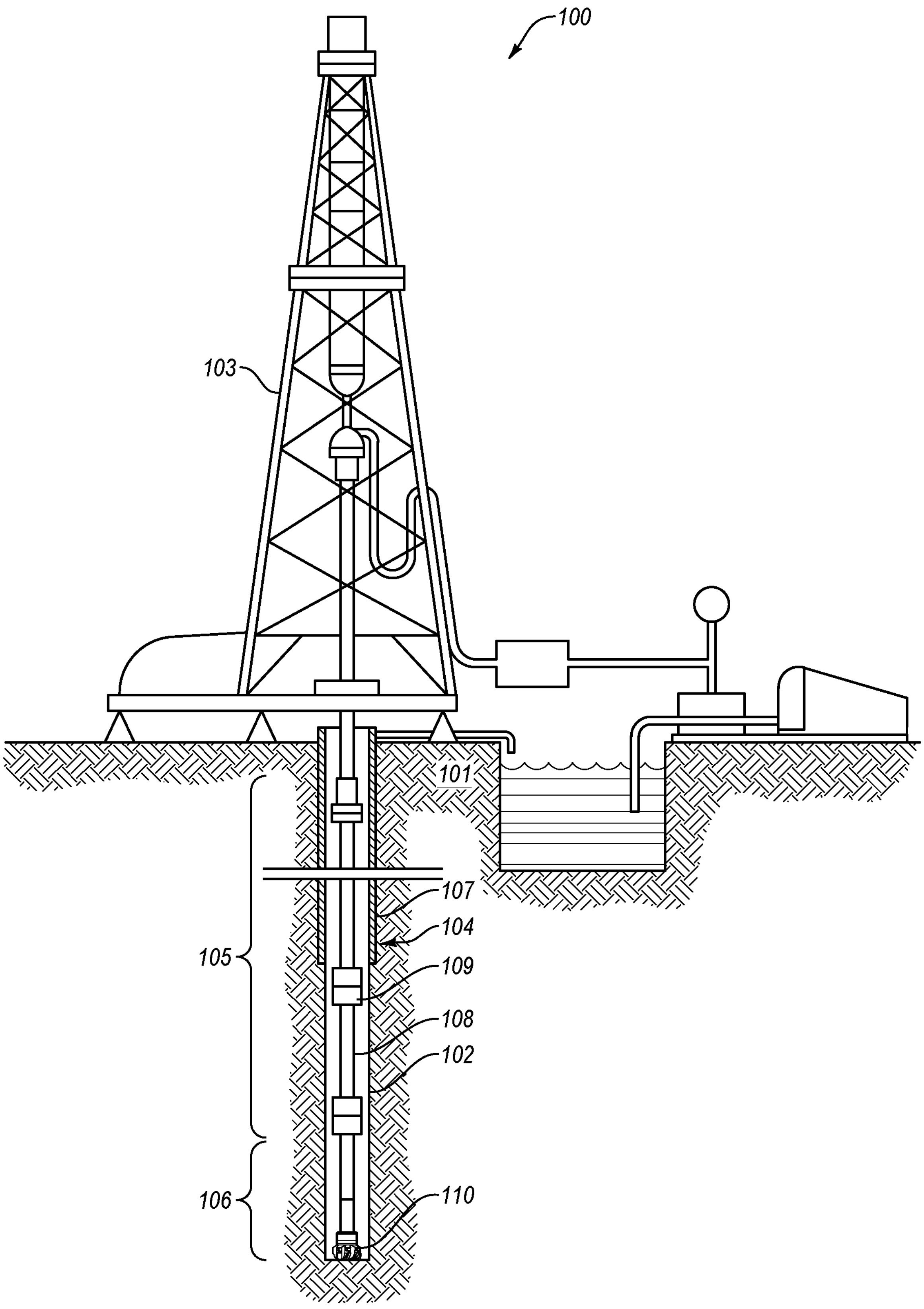
FIG. 1 is a representation of a schematic of a downhole drilling system, according to at least one embodiment of the present disclosure.

FIG. 1 shows one example of a drilling system 100 for drilling an earth formation 101 to form a wellbore 102. The drilling system 100 includes a drill rig 103 used to turn a drilling tool assembly 104 which extends downward into the wellbore 102. The drilling tool assembly 104 may include a drill string 105, a BHA 106, and a bit 110, attached to the downhole end of drill string 105.

The drill string 105 may include several joints of drill pipe 108 connected end-to-end through tool joints 109. The drill string 105 transmits drilling fluid through a central bore and transmits rotational power from the drill rig 103 to the BHA 106. In some embodiments, the drill string 105 may further include additional components such as subs, pup joints, etc. The drill pipe 108 provides a hydraulic passage through which drilling fluid is pumped from the surface. The drilling fluid discharges through selected-size nozzles, jets, or other orifices in the bit 110 for the purposes of cooling the bit 110 and cutting structures thereon, and for lifting cuttings out of the wellbore 102 as it is being drilled.

The BHA 106 may include the bit 110 or other components. An example BHA 106 may include additional or other components (e.g., coupled between to the drill string 105 and the bit 110). Examples of additional BHA components include drill collars, stabilizers, measurement-while-drilling ("MWD") tools, logging-while-drilling ("LWD") tools, downhole motors, underreamers, section mills, hydraulic disconnects, jars, vibration or dampening tools, other components, or combinations of the foregoing. The BHA 106 may further include a rotary steerable system ("RSS"). The RSS may include directional drilling tools that change a direction of the bit 110, and thereby the trajectory of the wellbore. At least a portion of the RSS may maintain a geostationary position relative to an absolute reference frame, such as gravity, magnetic north, and/or true north. Using measurements obtained with the geostationary position, the RSS may locate the bit 110, change the course of the bit 110, and direct the directional drilling tools on a projected trajectory.

According to embodiments of the present disclosure, a MEMS-type gyroscopic sensor may be located at the BHA 106. For example, the MEMS-type gyroscopic sensor may be located at an MWD, an LWD, an RSS, or other downhole tool of the BHA 106. In some embodiments, the MEMS-type gyroscopic sensor may be used to measure trajectory information used in directional drilling operations. For example, the MEMS-type gyroscopic sensor may be used to measure magnetic north, true (e.g., geographic) north.

In general, the drilling system 100 may include other drilling components and accessories, such as special valves (e.g., kelly cocks, blowout preventers, and safety valves). Additional components included in the drilling system 100 may be considered a part of the drilling tool assembly 104, the drill string 105, or a part of the BHA 106 depending on their locations in the drilling system 100.

The bit 110 in the BHA 106 may be any type of bit suitable for degrading downhole materials. For instance, the bit 110 may be a drill bit suitable for drilling the earth formation 101. Example types of drill bits used for drilling earth formations are fixed-cutter or drag bits. In other embodiments, the bit 110 may be a mill used for removing metal, composite, elastomer, other materials downhole, or combinations thereof. For instance, the bit 110 may be used with a whipstock to mill into casing 107 lining the wellbore 102. The bit 110 may also be a junk mill used to mill away tools, plugs, cement, other materials within the wellbore 102, or combinations thereof. Swarf or other cuttings formed by use of a mill may be lifted to surface, or may be allowed to fall downhole.

Figure 2:
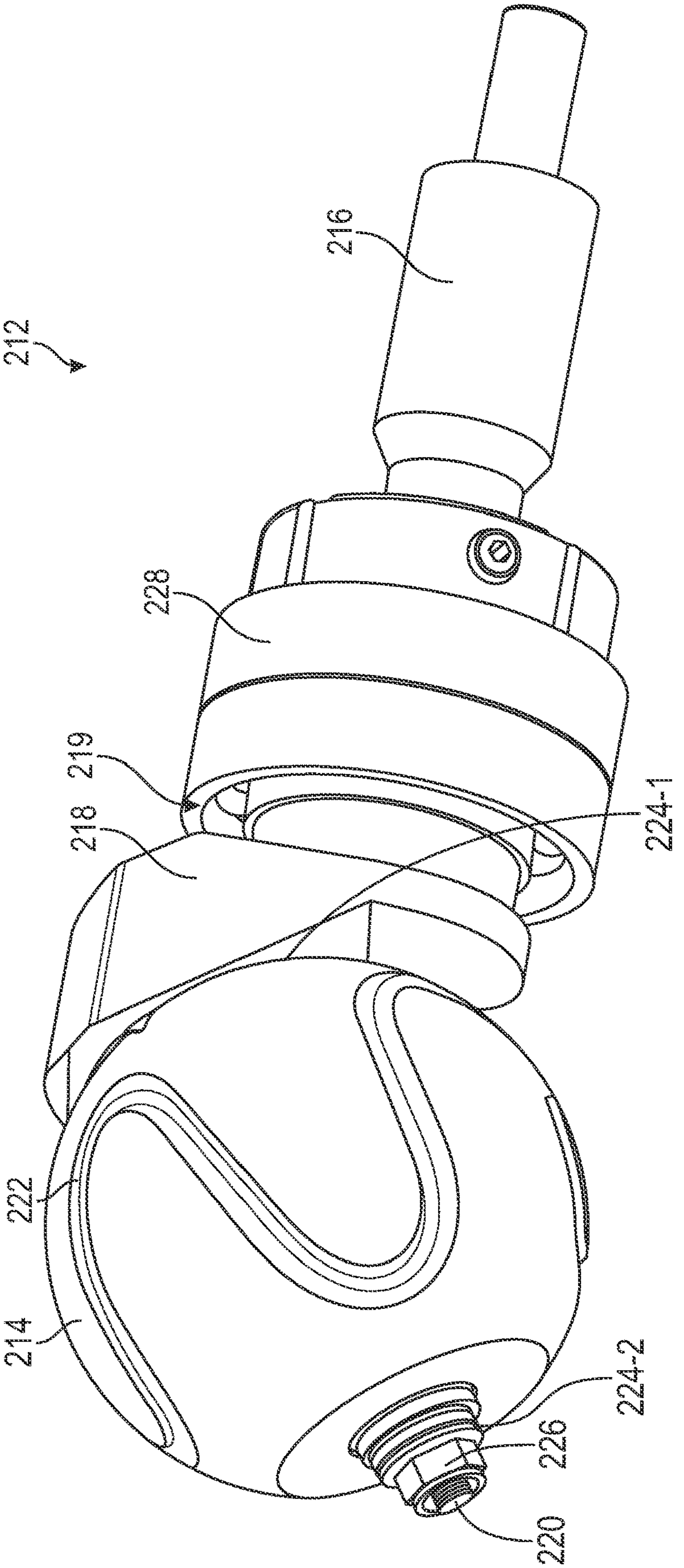
FIG. 2 is a representation of a perspective view of a system for supporting a sensor, according to at least one embodiment of the present disclosure.

FIG. 2 is a perspective view of a representation of a sensor support apparatus 212, according to at least one embodiment of the present disclosure. The sensor support apparatus 212 includes a shell 214 that encompasses a MEMS-type gyroscope. A primary shaft 216 is rigidly (e.g., rotationally) connected to a connection arm 218. The connection arm 218 may extend from a primary shaft first end 219 of the primary shaft 216. A secondary shaft 220 is rigidly (e.g., rotationally) connected to the connection arm 218 of the primary shaft 218. It should be understood that the terms "primary" and "secondary" are used to differentiate two structures (e.g., the primary shaft 216 and the secondary shaft 220), and do not provide any implication of relative importance, relevance, or criticality to the sensor support apparatus 212.

The secondary shaft 220 extends through the shell 214. In some embodiments, shell 214 may be inserted onto the secondary shaft 220 through a central axis of the shell 214. The shell 214 shown includes an indexing track 222 that follows a circuitous route around an outer surface of the shell 214. An indexing pin may be inserted into the indexing track 222. In some embodiments, a rotary actuator may cause the primary shaft 216 to rotate. This may cause the extension arm 218 to rotate eccentrically (e.g., not coaxially with a longitudinal axis of the primary shaft 216). Rotating the extension arm 218 eccentrically may cause the secondary shaft 220 to rotate eccentrically relative to the longitudinal axis of the primary shaft 216. The eccentric rotation of the secondary shaft 220 may cause the central axis of the shell 214 to rotate with the secondary shaft 220. This may cause rotational motion in two axes relative to the center of the shell 214. An indexing pin may be inserted into the indexing track 222. As the shell 214 rotates, the indexing pin may cause the shell 214 to rotate about the secondary shaft 220. Thus, the shell 214 may experience rotation along three different axes, thereby allowing six directions of measurements to be taken by the MEMS-type gyroscopic sensor located in the shell 214. In some embodiments, the shell 214 may include a protrusion that extends into the extension arm 218. The protrusion may include a bearing that allows the shell 214 to rotate without extending a secondary shaft 220 through the shell 214.

During rotation of the shell 214, the shell 214 may experience error-inducing movement that may reduce the accuracy of measurements from the MEMS-type gyroscopic sensor. For example, rotation of the shell 214 about the secondary shaft 220 is supported by a first shell bearing 224-1 (e.g., a first secondary shaft bearing) and a second shell bearing 224-2 (e.g., a second secondary shaft bearing). As the shell 214 moves, the first shell bearing 224-1 and/or the second shell bearing 224-2 may experience movement along the length of the secondary shaft 220 due to space between operating elements of the shell bearings, such as space between grooves and ball bearings in a deep-groove ball bearing. This may cause the shell 214 to move along the secondary shaft 220. This error-inducing movement of the shell 214 along the secondary shaft 220 may reduce the accuracy and/or repeatability of measurements made by the MEMS-type gyroscopic sensor located in the shell 214.

In some embodiments, the primary shaft 216 may experience error-inducing movement due to runout (e.g., eccentricity, non-centered rotation) from rotation of the primary shaft 216. This may cause the primary shaft 216 to wobble, which error-inducing motion may be transferred to the connection arm 218, the secondary shaft 220, and the shell 214. This may reduce measurement accuracy and/or repeatability.

According to embodiments of the present disclosure, and as will be discussed in greater detail herein, a means for pre-loading one or more bearings supporting rotation and/or movement of the shell 214 may reduce error-inducing movement of the shell 214 caused by slack in bearings, runout, out-of-path rotation, or other error-inducing movements of the shell 214. For example, a biasing element 226 may urge the second shell bearing 224-2 against the shell 214, which may push against the first shell bearing 224-1 and against the connection arm 218. This may take up some or all of the slack or play in the first shell bearing 224-1 and/or the second shell bearing 224-2 and reduce error-inducing movement of the shell 214 along the secondary shaft 220.

In some examples, a biasing element may push urge one or more primary shaft bearings 228 against a primary shaft shoulder 230 on the primary shaft 216. This may tighten the primary shaft bearings 228 against the primary shaft 216 and a housing at least partially surrounding the primary shaft 216. This may reduce runout and/or wobble of the primary shaft 216, thereby reducing error-inducing motion of the shell 214.

Figure 3:
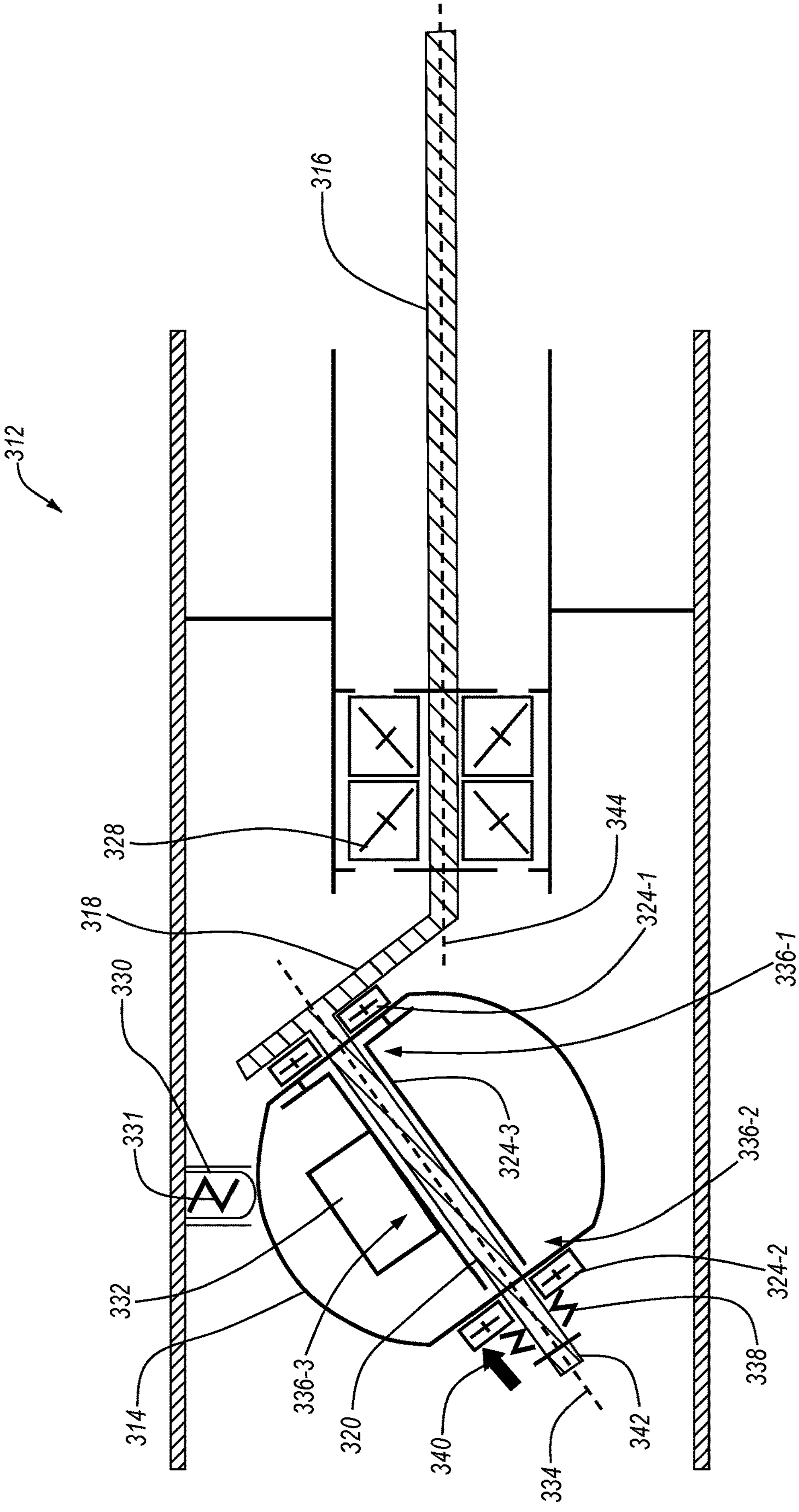
FIG. 3 is a representation of a schematic view of a system for supporting a sensor, according to at least one embodiment of the present disclosure.

FIG. 3 is a schematic representation of a sensor support apparatus 312, according to at least one embodiment of the present disclosure. The sensor support apparatus 312 shown includes a primary shaft 316 connected to a connection arm 318. A secondary shaft 320 is inserted through a shell 314 and rigidly connected to the connection arm 318. An indexing pin 330 is inserted into an indexing track (e.g., indexing track 222 of FIG. 2). The indexing pin 330 is biased into the indexing track 222 with an indexing pin resilient member 331 (e.g., a spring, a diaphragm) to maintain contact of the indexing pin 330 with the indexing track.

A MEMS-type gyroscope 332 is housed (e.g., located) within the shell 314. The MEMS-type gyroscope 332 may be any MEMS-type gyroscope. For example, the MEMS-type gyroscope 332 may include a ring that is vibrated in response to an applied electromagnetic field. The movement of the shell 314 may cause the MEMS-type gyroscope to apply force to a mounting block. The force may be measured and analyzed to determine the forces acting on the gyroscope. By knowing the rotational forces applied by the rotation of the primary shaft 316, the secondary shaft 320, and the shell 314, the orientation of geographic north may be determined based on the measured angular acceleration (e.g., the Coriolis acceleration) applied from rotation of the earth. To reduce outside magnetic interference (e.g., from the earth's magnetic field and/or from other tools on a BHA), the shell 314 may be made from a magnetically permeable material, thereby magnetically shielding the shell 314.

As the shell 314 rotates about a secondary shaft axis 334 of the secondary shaft 320, the shell 314 may experience error-inducing movement. For example, the shell 314 may experience longitudinal error-inducing movement (e.g., parallel to the secondary shaft axis 334). In some examples, the shell 314 may experience radial error-inducing movement (e.g., transverse or perpendicular to the secondary shaft axis 334). The rotation of the shell 314 about the secondary shaft axis 334 may be supported using one or more shell bearings (e.g., secondary shaft bearings, collectively 324). For example, a first shell bearing 324-1 may be located at a secondary shaft first end 336-1 between the shell 314 and the connection arm 31 and a second shell bearing 324-2 may be located at a secondary shaft second end 336-2.

In some embodiments, the first shell bearing 324-1 and the second shell bearing 324-2 may be any type of bearing. In some embodiments, the first shell bearing 324-1 and/or the second shell bearing 324-2 may support both longitudinal movement and radial movement. For example, the first shell bearing 324-1 and/or the second shell bearing 324-2 may be ball bearings, deep-groove ball bearings, angular contact ball bearings, needle bearings, roller bearings, needle bearings, any other type of bearing, and combinations thereof. In some embodiments, the first shell bearing 324-1 and/or the second shell bearing 324-2 may only support longitudinal motion. For example, the first shell bearing 324-1 and/or the second shell bearing 324-2 may be thrust bearings. In some embodiments, it may be critical that the first shell bearing 324-1 and the second shell bearing 324-2 are thrust bearings to withstand and operate under a loading force 340 applied by the biasing element 338.

In some embodiments, the first shell bearing 324-1 and the second shell bearing 324-2 may be pre-loaded using a biasing element 338. The biasing element 338 may be located at the secondary shaft second end 336-2. The biasing element 338 may apply a loading force 340 to the second shell bearing 324-2. The second shell bearing 324-2 may apply (e.g., transfer) the loading force 340 to the shell 314. The shell 314 may apply (e.g., transfer) the loading force 340 to the first shell bearing 324-1. The first shell bearing 324-1 may apply (e.g., transfer) the loading force 340 to the connection arm 318. The loading force 340 may take up any slack in the first shell bearing 324-1 and/or the second shell bearing 324-2. This may help to prevent error-inducing movement of the shell 314.

In some embodiments, the loading force 340 may be in a range having an upper value, a lower value, or upper and lower values including any of 50 N, 100 N, 200 N, 300 N, 400 N, 500 N, 600 N, 700 N, 800 N, 900 N, 1,000 N, 1,100 N, 1,200 N, 1,300 N, 1,400 N, 1,500 N, or any value therebetween. For example, the loading force 340 may be greater than 50 N. In another example, the loading force 340 may be less than 1,500 N. In yet other examples, the loading force 340 may be any value in a range between 50 N and 1,500 N. In some embodiments, it may be critical that the loading force 340 is greater than 500 N to reduce error-inducing movement of the shell 314.

In the embodiment shown, the secondary shaft 320 includes a retaining member 342. In some embodiments, the retaining member 342 may be mechanically attached to the secondary shaft 320. For example, the retaining member 342 may include a nut, a washer, a locking pin, a retaining clip, any other type of mechanical fastener or attachment, and combinations thereof. In some embodiments, the retaining member 342 may be permanently attached to the secondary shaft 320. For example, the retaining member 342 may be welded, brazed, or otherwise permanently attached to the secondary shaft 320.

In some embodiments, the biasing element 338 may be located between the retaining member 342 and the second shell bearing 324-2. The biasing element 338 may exert a spreading force between the retaining member 342 and the second shell bearing 324-2. This may place the secondary shaft 320 in tension. Furthermore, this may place the shell bearings 324 and the shell 314 in compression. In this manner, the shell bearings 324 are pre-loaded by the biasing element 338.

In some embodiments, the biasing element 338 may include any biasing element. For example, the biasing element 338 may include an elastically deformable material. In some examples, the biasing element 338 may include a piston, such as a hydraulic piston, a pneumatic piston, or other piston element. In some examples, the biasing element 338 may include a resilient member, such as a spring, a coil spring, one or more Belleville washers. In some embodiments, the biasing element 338 may include a resilient member 338 and the retaining member 342 may include a nut threaded onto the secondary shaft second end 336-2. The loading force 340 may be increased or decreased based on the extent to which the retaining member 342 is threaded onto the secondary shaft 320.

In some embodiments, the first shell bearing 324-1 may include more than one bearing. For example, the first shell bearing 324-1 may include a thrust bearing and an angular contact bearing. In some embodiments, the second shell bearing 324-2 may include more than one bearing. For example, the second shell bearing 324-2 may include a thrust bearing and a deep groove ball bearing.

In some embodiments, a third shell bearing 324-3 may be located inside of the shell 314. For example, the third shell bearing 324-3 may be located in a secondary shaft middle section 336-3. In some embodiments, the third shell bearing 324-3 may include any type of bearing, including a ball bearing, a journal bearing, or any other type of bearing. The third shell bearing 324-3 may provide support for radial movement of the shell 314 as it rotates about the secondary shaft axis 334. In some embodiments, utilizing a third shell bearing 324-3 that is a journal bearing in combination with a first shell bearing 324-1 and a second shell bearing 324-2 that are thrust bearings may allow for an increased loading force 340 while supporting axial movement and motion of the shell 314 against the secondary shaft 320. This may reduce error-inducing movement, thereby improving sensor measurement accuracy and repeatability.

In some embodiments, rotation of the primary shaft 316 about a primary shaft axis 344 may be supported by one or more primary shaft bearings 328. In some embodiments, the primary shaft bearings 328 may help to prevent runout or wobble of the primary shaft 316 about the primary shaft axis 344. In some embodiments, the primary shaft bearings 328 may be pre-loaded using one or more biasing elements, as will be discussed in further detail herein.

Figure 4:
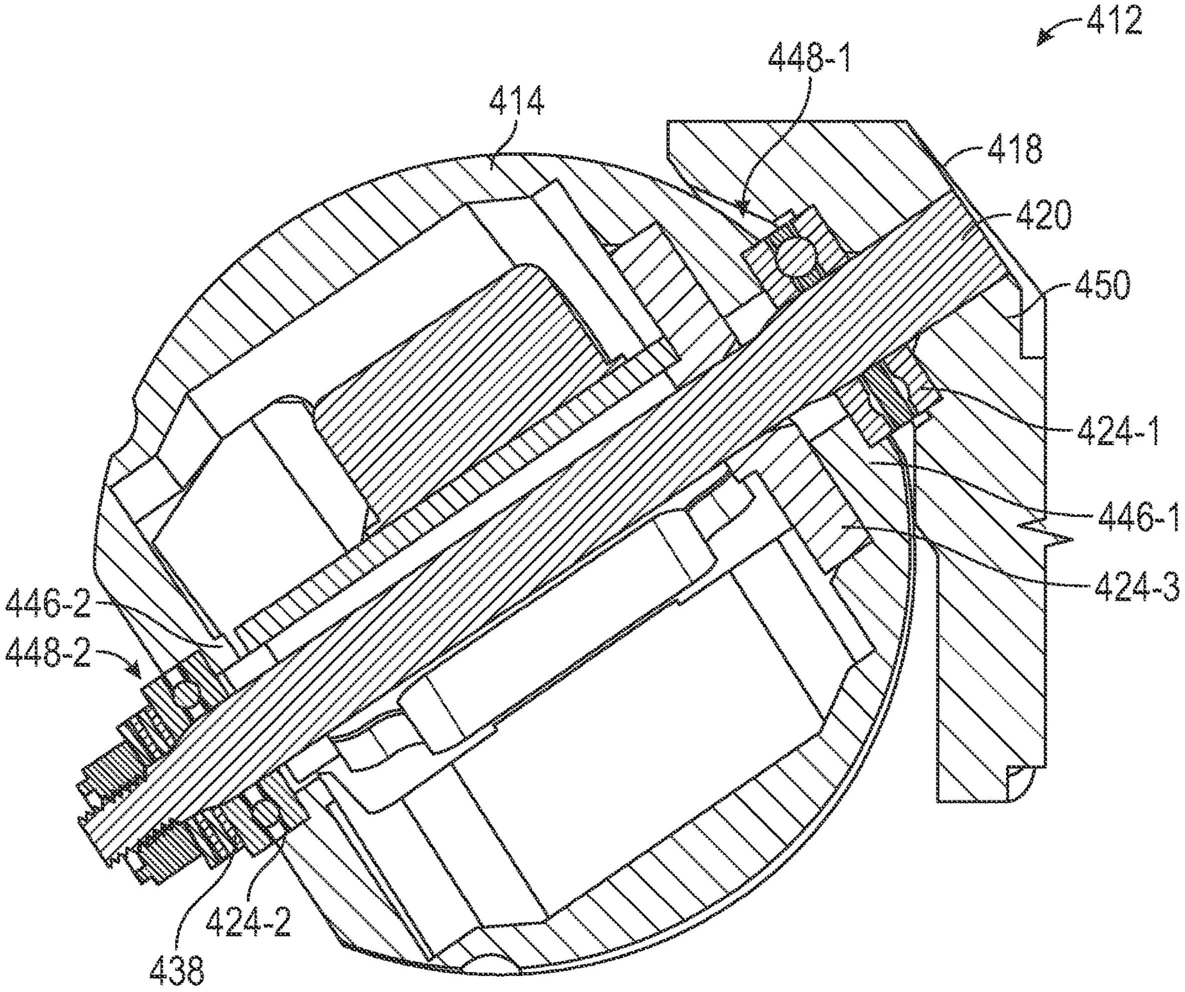
FIG. 4 is a representation of a longitudinal cross-sectional view of a system for supporting a sensor, according to at least one embodiment of the present disclosure.

FIG. 4 is a representation of a longitudinal cross-sectional view of a sensor support apparatus 412, according to at least one embodiment of the present disclosure. In the embodiment shown, the secondary shaft 420 is inserted into the connection arm 418. The secondary shaft 420 may be fixed to the connection arm 418 using any connection method, including a threaded connection, weld, braze, adhesive, any other type of connection, and combinations thereof. As may be seen, the secondary shaft 420 is inserted through the shell 414, a first shell bearing 424-1 (e.g., a secondary shaft first bearing), a second shell bearing 424-2 (e.g., a secondary shaft second bearing), and a third shell bearing 424-3 (e.g., a secondary shaft third bearing).

In the embodiment shown, the first shell bearing 424-1 and the second shell bearings 424-2 are thrust bearings, and the third shell bearing 424-3 is a journal bearing. A biasing element 438 places the first shell bearing 424-1, the second shell bearing 424-2, and the shell 414 under compression. The biasing element 438 shown is a series of Belleville washers. The second shell bearing 424-2 abuts (e.g., directly contacts) a second shell shoulder 446-2 at a shell second end 448-2. The first shell bearing 424-1 abuts (e.g., directly contacts) a first shell shoulder 446-1 at a shell first end 448-1. The first shell bearing 424-1 further abuts (e.g., directly contacts) the connection arm 418 at a connection arm shoulder 450. The first shell shoulder 446-1, the second shell shoulder 446-2, and the connection arm shoulder 450 may provide secure surfaces for the first shell bearing 424-1 and the second shell bearing 424-2. This may allow the shell 414 to rotate relative to the biasing element 438, the secondary shaft 420, and the connection arm 418. Furthermore, these shoulders may provide a secure surface for the biasing element 438 to apply the loading force during pre-loading.

Figure 5:
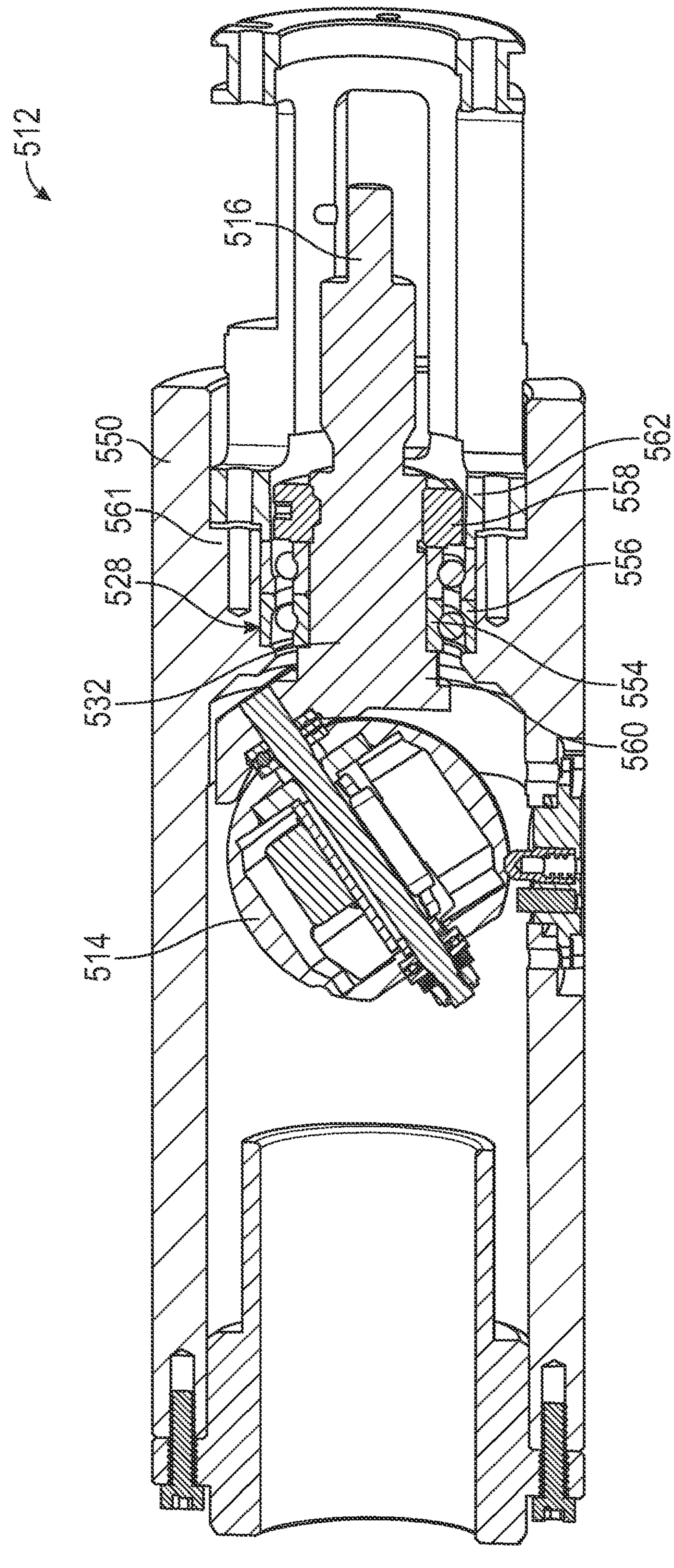
FIG. 5 is a representation of a longitudinal cross-sectional view of another system for supporting a sensor, according to at least one embodiment of the present disclosure.

FIG. 5 is a representation of a longitudinal cross-sectional view of a sensor support apparatus 512, according to at least one embodiment of the present disclosure. In the embodiment shown, shell 514 is located in a housing 552. The housing 552 may be the housing for a BHA, or may be located in a BHA. In this manner, the sensor support apparatus 512 may be deployed downhole. This may allow a MEMS-type gyroscope 532 to take trajectory measurements downhole.

As discussed above, in some embodiments, rotation of the primary shaft 516 may be supported by one or more primary shaft bearings 528. The primary shaft bearings 528 may include an inner member 554 and an outer member 556. The inner member 554 may contact the primary shaft 516 and the outer member 554 may contact the housing 550 at a housing shoulder 561. In some embodiments, movement between the inner member 554 and the outer member 554 during rotation may allow the primary shaft 516 to wobble or experience error-inducing movement.

To reduce error-inducing movement, the one or more primary shaft bearings 528 may be pre-loaded. In some embodiments, the inner member 554 may be pre-loaded separately from the outer member 556. For example, the inner member 554 may be pre-loaded with an inner loading force by an inner member biasing element 558. The inner member biasing element 558 may urge the inner member 554 against a primary shaft shoulder 560 with the inner loading force. In the embodiment shown, the inner member biasing element 558 is a ring threaded onto the primary shaft 516. As the inner member biasing element 558 is threaded further onto the shaft, the inner member biasing element 558 may apply a loading force to the primary shaft shoulder through the inner member 554. In some embodiments, the inner member biasing element 558 may be any biasing element, including a resilient member (e.g., a spring), a hydraulic piston, a pneumatic piston, or any other biasing element.

An outer member biasing element 562 may pre-load the outer member 556 against a housing shoulder 561 with an outer loading force. In the embodiment shown, the outer member biasing element 562 is a housing or other element that is connected to the housing 550 with one or more mechanical fasteners, which apply the outer loading force as the mechanical fasteners are tightened. In some embodiments, the outer member biasing element 562 may be any biasing element, including a threaded nut or ring, a resilient member (e.g., a spring), a hydraulic piston, a pneumatic piston, or any other biasing element 562.

In some embodiments, the primary shaft bearings 528 may be angular contact bearings. In this manner, at least one of the outer member 556 or the inner member 554 may have an angled (e.g., slanted) ball bearing contact surface. By pre-loading the inner member 554 and the outer member 556, the angled ball bearing contact surface may slide along the bearing until all the slack, play, or extra distance in the primary shaft bearing 528 is removed. This may help to center the primary shaft 516. In some embodiments, the angled ball bearing contact surface may be located on the inner member 554. In some embodiments, the angled ball bearing contact surface may be located on the outer member 554. In the embodiment shown, the angled ball bearing contact surface is located on the outer member 556. In some embodiments, multiple primary shaft bearings **528*f* may all have an angled ball bearing contact surface on the outer member 556 or the inner member 554. In some embodiments, a first primary shaft bearing may have an angled ball bearing contact surface on the outer member 556 and a second primary shaft bearing may have an angled ball bearing contact surface on the inner member 554 and vice versa. In some embodiments, each angled ball bearing contact surface may angle in the same direction (e.g., radially outward toward or away from the shell 514). In some embodiments, a first primary shaft bearing may have an angled ball bearing contact surface angled radially outward toward the shell 514 and a second primary shaft bearing may have an angled ball bearing contact surface angled radially away from the shell 514**, and vice versa.

Figures 1, 6:
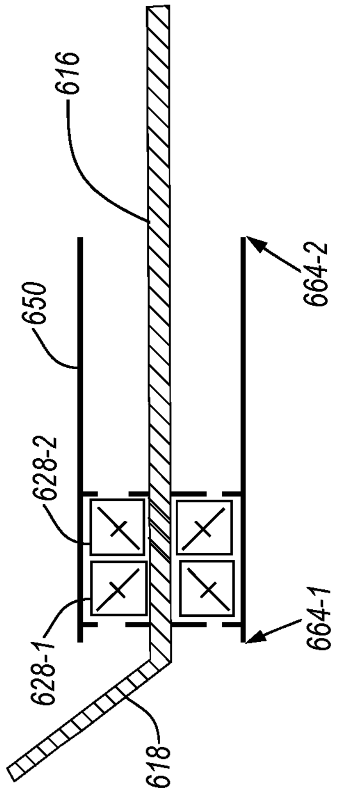
Figures 2, 6:
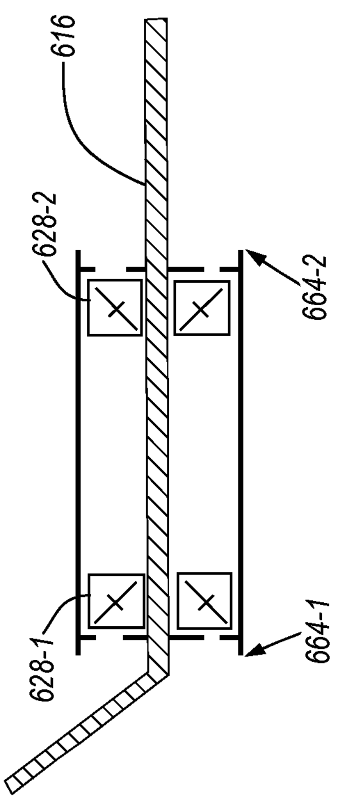
Figures 3, 6:
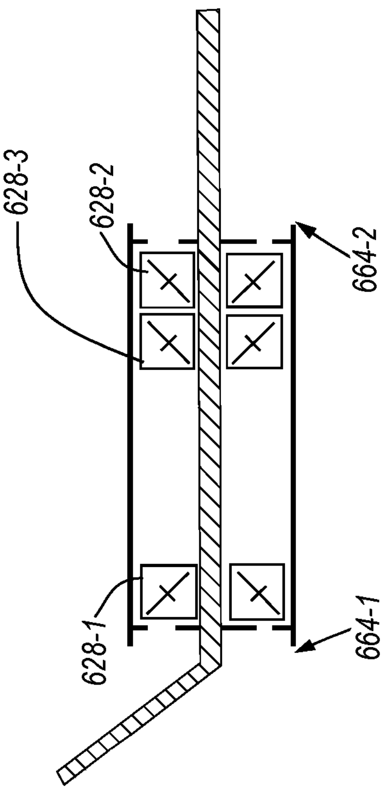
Figures 4, 6:
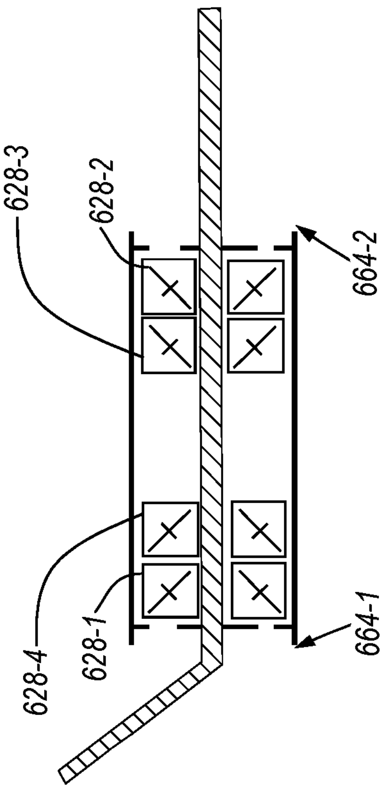

FIG. 6-1 through FIG. 6-4 are schematic representations of arrangements for primary shaft bearings (collectively 628) on a primary shaft 616, according to embodiments of the present disclosure. Referring to FIG. 6-1, a first primary shaft bearing 628-1 and a second primary shaft bearing 628-2 are connected to the primary shaft 616 at housing first end 664-1 of a primary shaft section of a housing 650, near an extension arm 618. In the embodiment shown, the first primary shaft bearing 628-1 is adjacent to the second primary shaft bearing 628-2. In the embodiment shown, the both the first primary shaft bearing 628-1 and the second primary shaft bearing 628-2 are angle contact bearings. In some embodiments, the primary shaft bearings 628 may be pre-loaded using the same biasing element (e.g., inner biasing element 558 and/or outer biasing element 562).

In FIG. 6-2, the first primary shaft bearing 628-1 is offset from the second primary shaft bearing 628-2. The first primary shaft bearing 628-1 may be located at the housing first end 664-1 and the second primary shaft bearing 628-2 may be located at or closer to a housing second end 664-2 than the housing first end 664-1. The first primary shaft bearing 628-1 is spaced apart from (e.g., not touching) the second primary shaft bearing 628-2. In some embodiments, the first primary shaft bearing 628-1 and the second primary shaft bearing 628-2 are preloaded. In some embodiments, the first primary shaft bearing 628-1 is pre-loaded using a different biasing element than the second primary shaft bearing 628-2. Locating the shaft bearings 628 at different ends of the housing 650 may stabilize the primary shaft 616 from more than one location. This may help to reduce wobble and/or runout of the primary shaft 616 during operation.

In FIG. 6-3, the first primary shaft bearing 628-1 is located at the housing first end 664-1 and the second primary shaft bearing 628-2 is located at the housing second end 664-2. A third primary shaft bearing 628-3 is located adjacent to (e.g., in contact with) the second primary shaft bearing 628-2. In some embodiments, the third primary shaft bearing 628-3 may be a different type of bearing than one or both of the first primary shaft bearing 628-1 or the second primary shaft bearing 628-2. For example, the third primary shaft bearing 628-3 may be a needle bearing, and the second primary shaft bearing 628-2 may be an angular contact bearing. Locating different types of primary shaft bearings 628 adjacent to each other may provide multiple types of support for the primary shaft 616. For example, a needle bearing third primary shaft bearing 628-3 may provide good radial support and a deep groove ball bearing second primary shaft bearing 628-2 may provide good longitudinal support. This may help to further stabilize the primary shaft 616. While the third primary shaft bearing 628-3 is shown as adjacent to the second primary shaft bearing 628-2, it should be understood that the third primary shaft earing 628-3 may be located adjacent to the first primary shaft bearing 628-1.

In FIG. 6-4, the first primary shaft bearing 628-1 is located at the housing first end 664-1 and the second primary shaft bearing 628-2 is located at the housing second end 664-2. The third primary shaft bearing 628-3 is located adjacent to (e.g., in contact with) the second primary shaft bearing 628-2, and a fourth primary shaft bearing 628-4 is located adjacent to (e.g., in contact with) the first primary shaft bearing 628-1. In some embodiments, the fourth primary shaft bearing 628-4 may be a different type of bearing than the first primary shaft bearing 628-1. For example, the fourth primary shaft bearing 628-4 may be an angular contact bearing and the first primary shaft bearing 628-1 may be a thrust bearing. Locating a fourth primary shaft bearing 628-4 adjacent to the first primary shaft bearing 628-1 and a third primary shaft bearing 628-3 adjacent to the second primary shaft bearing 628-2 may provide multiple types of support for the primary shaft, thereby reducing wobble and runout from rotation of the primary shaft 616.

Figures 1, 7:
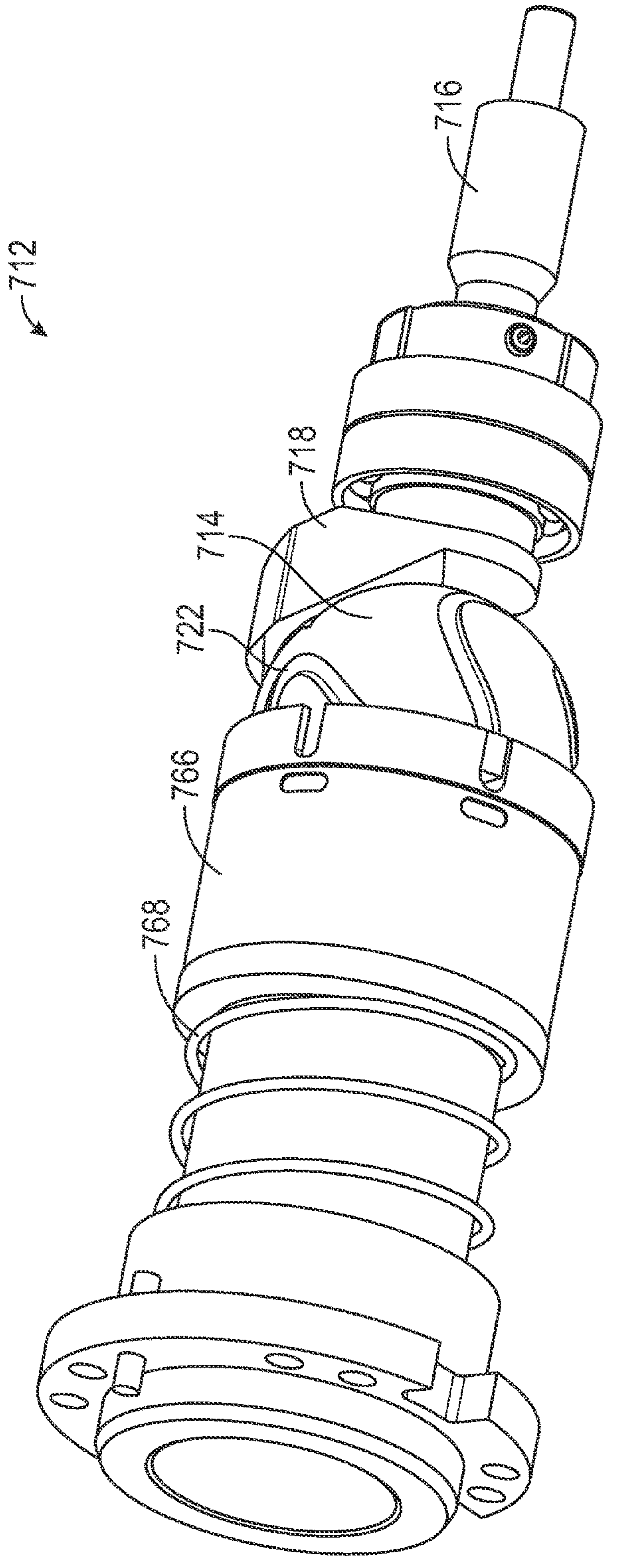
Figures 2, 7:
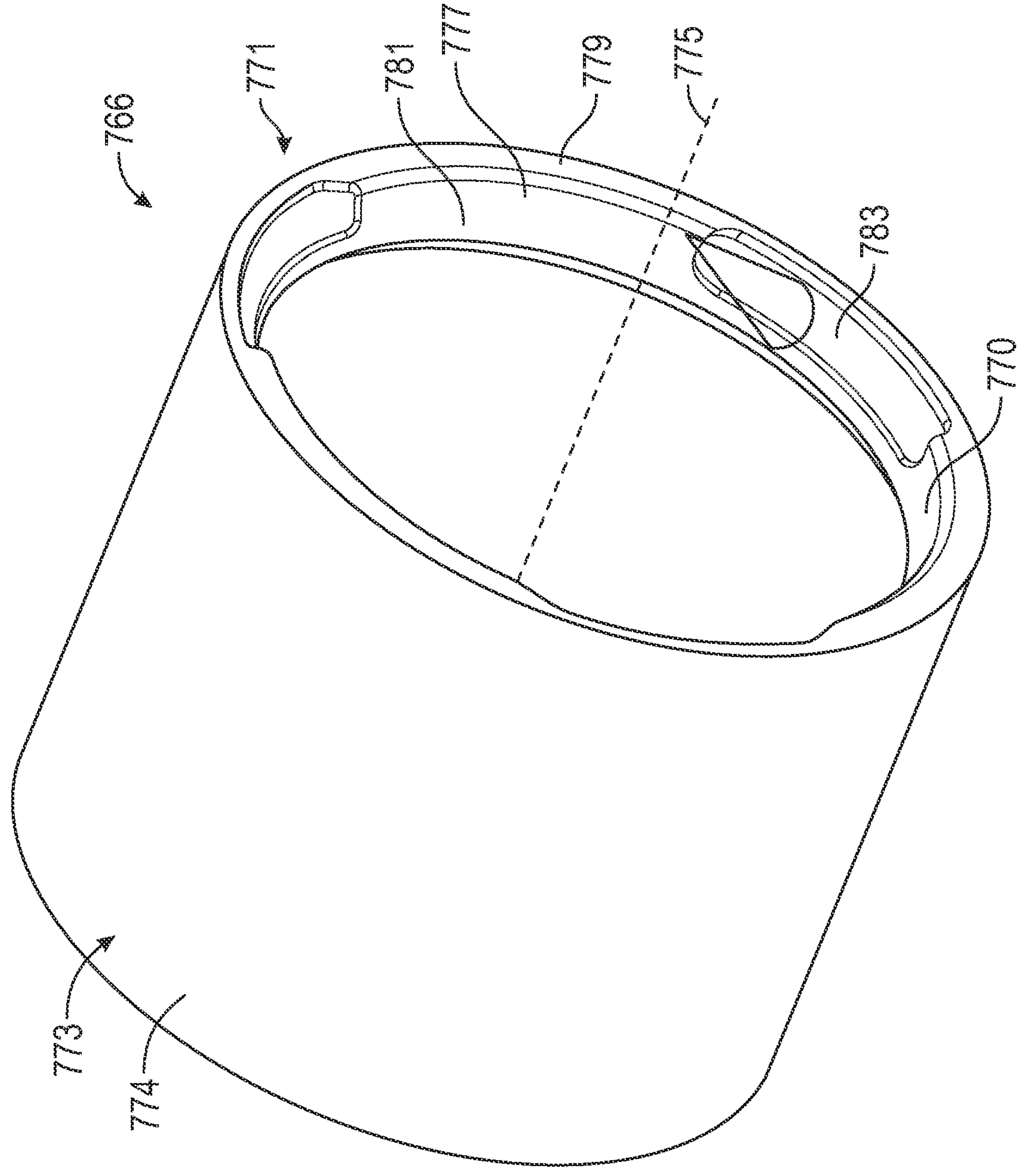

FIG. 7-1 is a representation of a sensor support apparatus 712, according to at least one embodiment of the present disclosure. The sensor support apparatus 712 includes a shell 714 that encompasses a MEMS-type gyroscope. A primary shaft 716 is rigidly (e.g., rotationally) connected to a connection arm 718. A secondary shaft is rigidly (e.g., rotationally) connected to the connection arm 718 of the primary shaft 718. The secondary shaft 720 extends through the shell 714. In some embodiments, shell 714 may be inserted onto the secondary shaft 720 through a central axis of the shell 714.

The shell 714 shown includes an indexing track 722 that follows a circuitous route around an outer surface of the shell 714. An indexing pin may be inserted into the indexing track 722. In some embodiments, a rotary actuator may cause the primary shaft 716 to rotate. This may cause the extension arm 718 to rotate to rotate eccentrically (e.g., not coaxially with a longitudinal axis of the primary shaft 716). Rotating the extension arm 718 eccentrically may cause the secondary shaft to rotate eccentrically relative to the longitudinal axis of the primary shaft 716. The eccentric rotation of the secondary shaft 720 may cause the central axis of the shell 714 to rotate with the secondary shaft. This may cause rotational motion in two axes relative to the center of the shell 714. An indexing pin may be inserted into the indexing track 722. As the shell 714 rotates, the indexing pin may cause the shell 714 to rotate about the secondary shaft 720. Thus, the shell 714 may experience rotation along three different axes, thereby allowing six directions of measurements to be taken by the MEMS-type gyroscopic sensor located in the shell 714.

In the embodiment shown, a seat bearing 766 supports rotation of the shell 714. The seat bearing 766 includes a seat pad that has a seat profile that at least partially matches an outer profile of the shell 714. In other words, because the shell 714 is spherical, the seat pad has a radius of curvature that matches the outer radius of the shell 714. This may allow the shell 714 to rotate freely about different axes on the seat pad.

A seat biasing element 768 pre-loads (e.g., biases) the seat bearing 766 against the shell 714. Pre-loading the seat bearing 766 may help to reduce error-inducing movement by the shell 714. This may improve measurement accuracy and/or repeatability by a MEMS-type gyroscopic sensor located in the shell 714. In the embodiment shown, the seat biasing element 768 is a coil spring. In some embodiments, the seat biasing element may be any type of biasing element, including mechanical and/or electromechanical biasing elements, such as a wave spring, a hydraulic piston, a pneumatic piston, an elastically deformable material, an electromechanical motor, a linear motor, a solenoid, a worm gear, a piezoelectric stack, any other type of biasing element, and combinations thereof.

In the embodiment shown, the seat bearing 766 is pre-loaded against the shell 714 with a seat biasing element 768. In some embodiments, the seat biasing element 768 may pre-load the seat bearing 766 with a seat loading force. In some embodiments, the seat loading force may be in a range having an upper value, a lower value, or upper and lower values including any of 5 N, 10 N, 20 N, 30 N, 50 N, 100 N, 200 N, 300 N, 400 N, 500 N, or any value therebetween. For example, the seat loading force may be greater than 5 N. In another example, the seat loading force may be less than 500 N. In yet other examples, the seat loading force may be any value in a range between 5 N and 500 N. Pre-loading the seat bearing 766 may support the shell 714 during rotation of the shell 714. In some embodiments, pre-loading the seat bearing 766 may support the shell 714 during high vibration downhole drilling operations. For example, while drilling, the primary shaft 716 may not rotate, but the sensor support apparatus 712 may experience shock and vibration forces caused by drilling activities. Pre-loading the seat bearing 766 may help to reduce damage to the sensor support apparatus 712, including bending components and/or damaging the MEMS-type gyroscope. This may help to improve accuracy and/or repeatability of measurements by preventing damage that may place the MEMS-type gyroscope out of calibration. In some embodiments, it may be critical that the seat loading force is greater than 50 N to protect the sensor support apparatus 712 from shock and vibration damage.

FIG. 7-2 is a representation of the seat bearing 766 of FIG. 7-1, according to at least one embodiment of the present disclosure. The seat bearing 766 includes a seat pad 770 located at a seat bearing first end 771 of a seat body 774. The seat pad 770 may be configured to abut (e.g., contact) a shell (e.g., shell 714 of FIG. 7-1). Thus, the seat pad 770 may have a spherical surface that matches the surface profile of the shell. A biasing element may contact the second end 773 of the body 774 to urge the seat bearing 766 to the shell.

The seat pad 770 may be formed from a low-friction material. For example, the seat pad 770 may be formed from polytetrafluorethylene ("PTFE"), aluminum, bronze, or a PTFE filled polymer. A low-friction material may help reduce friction between the shell 714 and the seat pad 770. This may help reduce the torque required to rotate the primary shaft 716. In some embodiments, the seat pad 770 may be formed from the same material as the seat body 774. In some embodiments, the seat pad 770 may be formed from a different material than the seat body 774.

In some embodiments, the seat pad 770 may have a seat pad area. The seat pad area may be the surface area of the seat pad 770. The shell 714 has a shell surface area, which is the shell surface area of the outer surface of the shell. In some embodiments, the seat pad area is a pad area percentage of the shell surface area. In some embodiments, the pad area percentage may be in a range having an upper value, a lower value, or upper and lower values including any of 1%, 2%, 3%, 4%, 5%, 10%, 15%, 20%, 25%, 30%, 35%, 40%, 45%, 50%, or any value therebetween. For example, the pad area percentage may be greater than 1%. In another example, the pad area percentage may be less than 50%. In yet other examples, the pad area percentage may be any value in a range between 1% and 50%. In some embodiments, it may be critical that the pad area percentage is less than 50% to easily secure and support the seat bearing 766 to the shell 714.

In some embodiments, the seat pad 770 may have an arc length 777, which is the arc length 777 of seat pad 770 material from the longitudinal axis 775 of the seat pad 770 between a leading edge 779 and a trailing edge 781 of the seat pad 770. In some embodiments, the arc length 777 may be in a range having an upper value, a lower value, or upper and lower values including any of 0.1°, 0.5°, 1.0°, 2.5°, 5.0°, 10°, 15°, 20°, 30°, 45°, 60°, 75°, 90°, or any value therebetween. For example, the arc length 777 may be greater than 0.1°. In another example, the arc length 777 may be less than 90°. In yet other examples, the arc length 777 may be any value in a range between 0.1° and 90°. In some embodiments, it may be critical that the arc length 777 is less than 90° to easily secure and remove the seat bearing 766 to the shell 714.

In some embodiments, the seat pad 770 may include one or more seat pad gaps 783. The seat pad gaps 783 may be recessed sections of the seat pad 770 that do not contact the shell 714. A circumferential contact arc length is a total arc length of the seat pad 770 that contacts the shell 714 (e.g., subtracting out any seat pad gaps 783). In some embodiments, the circumferential contact arc length may be in a range having an upper value, a lower value, or upper and lower values including any of 0.1°, 0.5°, 1.0°, 2.5°, 5.0°, 10°, 15°, 20°, 30°, 45°, 60°, 90°, 120°, 150°, 180°, 210°, 240°, 270°, 300°, 330°, 360°, or any value therebetween. For example, the circumferential arc length may be greater than 0.1°. In another example, the circumferential arc length may be less than 360°. In yet other examples, the circumferential arc length may be any value in a range between 0.1° and 360°. In some embodiments, it may be critical that the circumferential arc length is less than 180° to easily secure and remove the seat bearing 766 to the shell 714.

In some embodiments, a leading edge diameter of the leading edge 779 may be a leading edge percentage of a maximum diameter of the shell 714. In some embodiments, the leading edge percentage may be in a range having an upper value, a lower value, or upper and lower values including any of 1%, 2%, 5%, 10%, 15%, 20%, 25%, 30%, 35%, 40%, 45%, 50%, or any value therebetween. For example, the leading edge percentage may be greater than 1%. In another example, the leading edge percentage may be less than 50%. In yet other examples, the leading edge percentage may be any value in a range between 1% and 50%. In some embodiments, it may be critical that the leading edge percentage is less than 50% to easily secure and remove the seat bearing 766 to the shell 714.

In some embodiments, a trailing edge diameter of the trailing edge 781 may be a trailing edge percentage of the maximum diameter of the shell 714. In some embodiments, the trailing edge percentage may be in a range having an upper value, a lower value, or upper and lower values including any of 1%, 5%, 10%, 15%, 20%, 25%, 30%, 35%, 40%, 45%, 50%, or any value therebetween. For example, the leading edge percentage may be greater than 1%. In another example, the trailing edge percentage may be less than 50%. In yet other examples, the trailing edge percentage may be any value in a range between 1% and 50%. In some embodiments, it may be critical that the trailing edge percentage is less than 50% to easily secure and remove the seat bearing 766 to the shell 714.

Figure 8:
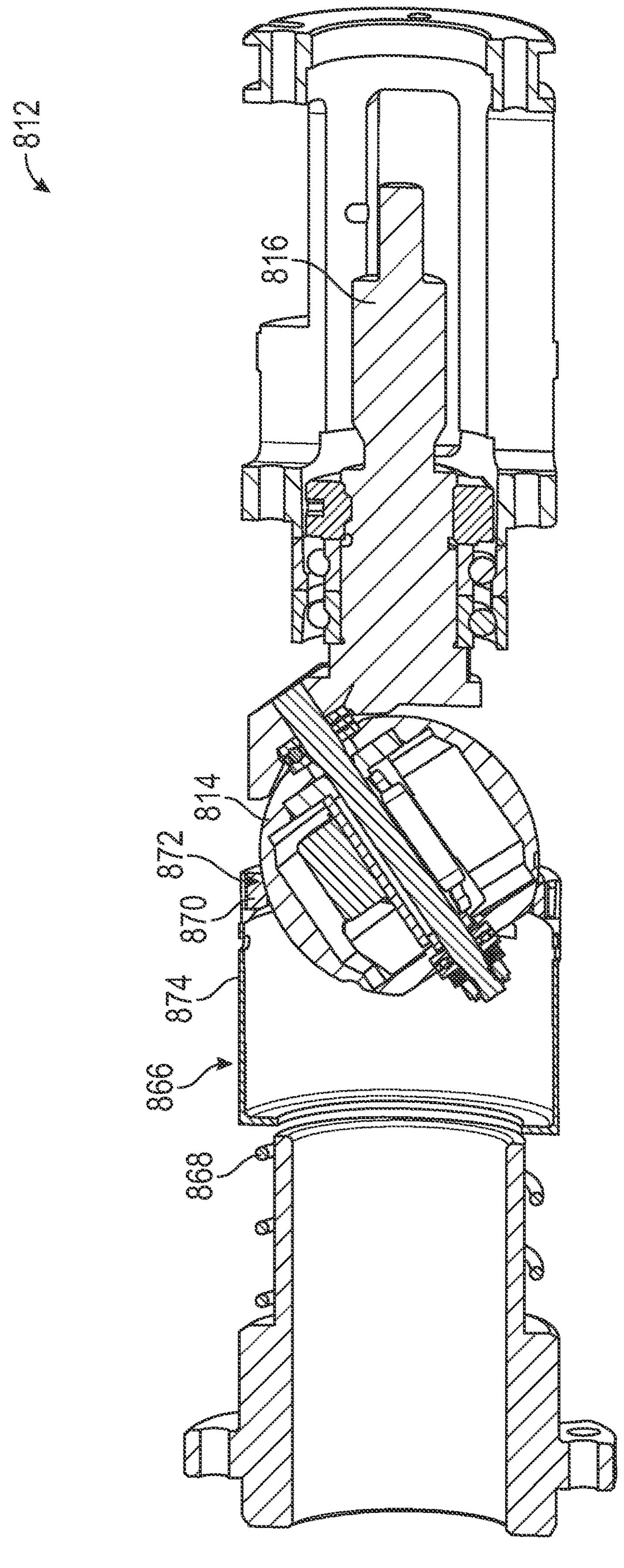
FIG. 8 is a representation of a longitudinal cross-sectional view of a further system for supporting a sensor, according to at least one embodiment of the present disclosure.

FIG. 8 is a representation of a cross-sectional view of a sensor support apparatus 812, according to at least one embodiment of the present disclosure. As may be seen the seat bearing 866 contacts the shell 814 with a seat pad 870. The seat pad 870 has a seat pad profile 872 that is at least partially complementary to a shell profile of the shell 814. Because the shell 814 has a spherical outer profile, the seat pad profile 872 is at least partially spherical (e.g., has a seat pad radius of curvature that is the same as a shell outer radius of curvature). In some embodiments, the seat pad profile 872 has a radius of curvature that is larger than the radius of curvature of the shell.

In some embodiments, the shell 814 slides relative to the seat pad 870. In other words, the seat bearing 866 is a static bearing, meaning that the seat bearing 866 or the seat pad 870 do not move as the shell 814 moves. For example, a seat body 874 and/or the seat pad of the seat bearing 866 may not rotate relative to the shell 814. In some embodiments, at least a portion of the seat bearing 866 moves as the shell 814 moves. For example, the seat body 874 of the seat bearing 866 may rotate relative to the shell 814. In some examples, the seat pad 870 may rotate relative to the seat body 874 and the shell 814.

In some embodiments, the seat pad 870 may contact the shell 814 with a running fit (ISO H8/h7, H9/e9, H9/d9). In some embodiments, the seat pad 870 may contact the shell 814 with a sliding fit (ISO H7/g6). For example, the seat pad profile 872 may have a radius of curvature difference between the seat pad radius of curvature and the radius of curvature of the shell 814. In some embodiments, the radius of curvature difference may be in a range having an upper value, a lower value, or upper and lower values including any of +/−0.05 mm, 0.1 mm, 0.2 mm, 0.3 mm, 0.4 mm, 0.5 mm, 0.6 mm, 0.7 mm, 0.8 mm, 0.9 mm, 1.0 mm or any value therebetween. For example, the radius of curvature difference may be greater than 0.05 mm. In another example, the radius of curvature difference may be less than 1.0 mm. In yet other examples, the radius of curvature difference may be any value in a range between 0.05 mm and 1.0 mm. In some embodiments, it may be critical that the radius of curvature difference is less than 0.5 mm to provide support to the shell 814.

Figure 9:
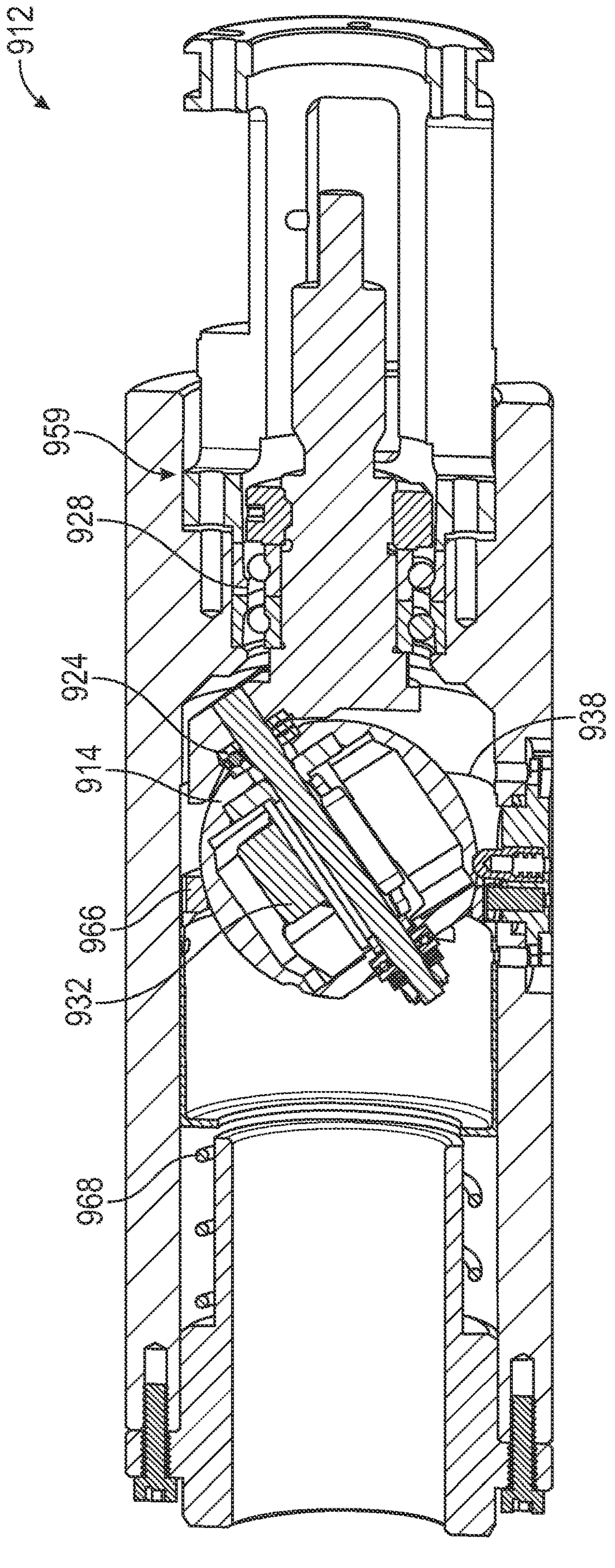
FIG. 9 is a representation of a longitudinal cross-sectional view of still another system for supporting a sensor, according to at least one embodiment of the present disclosure.

FIG. 9 is a representation of a cross-sectional view of a sensor support apparatus 912, according to at least one embodiment of the present disclosure. In the embodiment shown, each of the bearings supporting a shell 914 are pre-loaded. For example, a pair of primary shaft bearings 928 are pre-loaded with a primary shaft biasing element 959 (as discussed in reference to FIG. 5). A set of shell bearings 924 are pre-loaded with a shell biasing element 938 (as discussed in reference to FIG. 4). And a seat bearing 966 is pre-loaded with a seat biasing element 968. In this manner, the shell 914 and the MEMS-type gyroscope 932 housed within may be supported during both operation (e.g., when the shell 914 is rotating) and during drilling operations (e.g., high shock and vibration loading). This may help to improve the accuracy and/or repeatability of measurements taken by the MEMS-type gyroscope 932.

Figure 10:
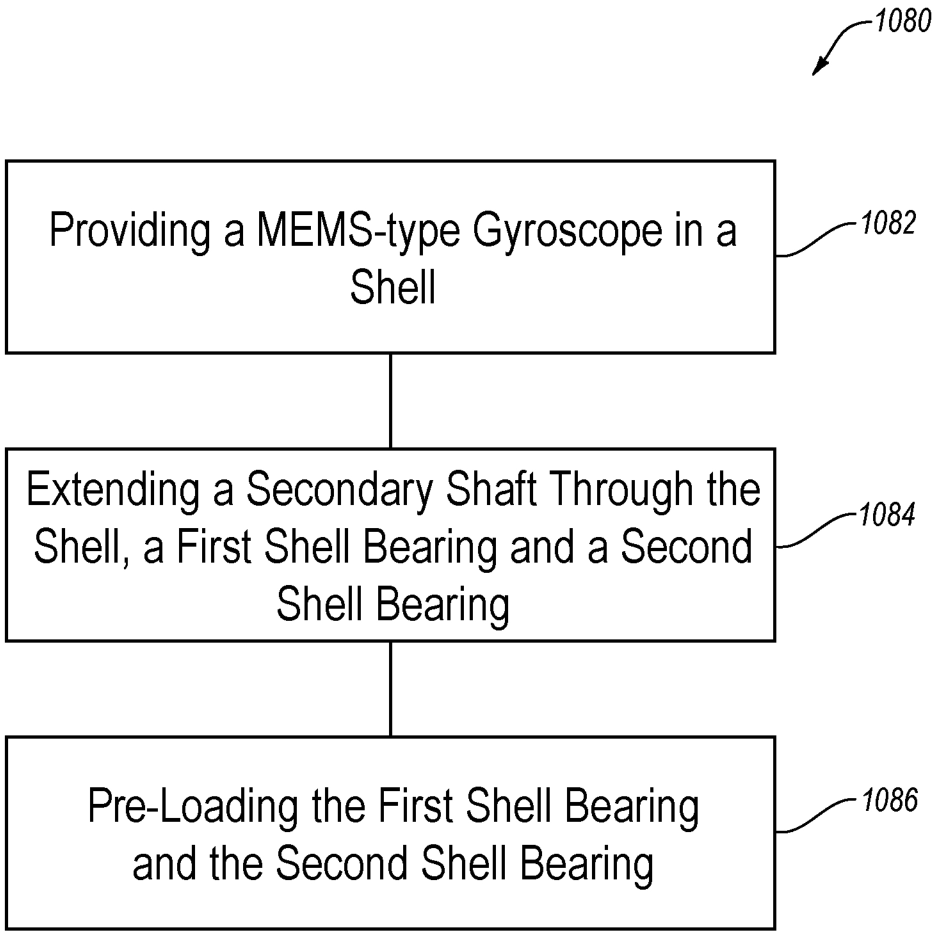
FIG. 10 is a representation of a method for assembling a gyroscopic sensor, according to at least one embodiment of the present disclosure.

FIG. 10 is a representation of a method 1080 for assembling a gyroscopic sensor, according to at least one embodiment of the present disclosure. The method includes providing a MEMS-type gyroscope in a shell at 1082. A secondary shaft may be extended through the shell at 1084. The secondary shaft is connected to a connection arm of a primary shaft at a first secondary shaft end. The secondary shaft further extends through a first shell bearing located between the shell and the connection arm and a second shell bearing opposite the shell from the first shell bearing. The second shell bearing is located at a second secondary shaft end.

The method further includes pre-loading the first bearing and the second bearing at 1086. In some embodiments, pre-loading the first bearing and the second bearing includes applying a loading force to the second bearing. The loading force may be applied with a biasing element. The biasing element may transfer the loading force through the second bearing, the shell, the first bearing, to the connection arm. In some embodiments, the loading force may place the shell under compression and the secondary shaft under tension.

In some embodiments, the method may include securing a retaining member to the second secondary shaft end. The retaining member may contact the biasing element to apply the loading force. In some embodiments, securing the retaining member may include threading a nut onto the second secondary shaft end. In some embodiments, pre-loading the first bearing and the second bearing includes preloading with a loading force of at least 500 N.

Figure 11:
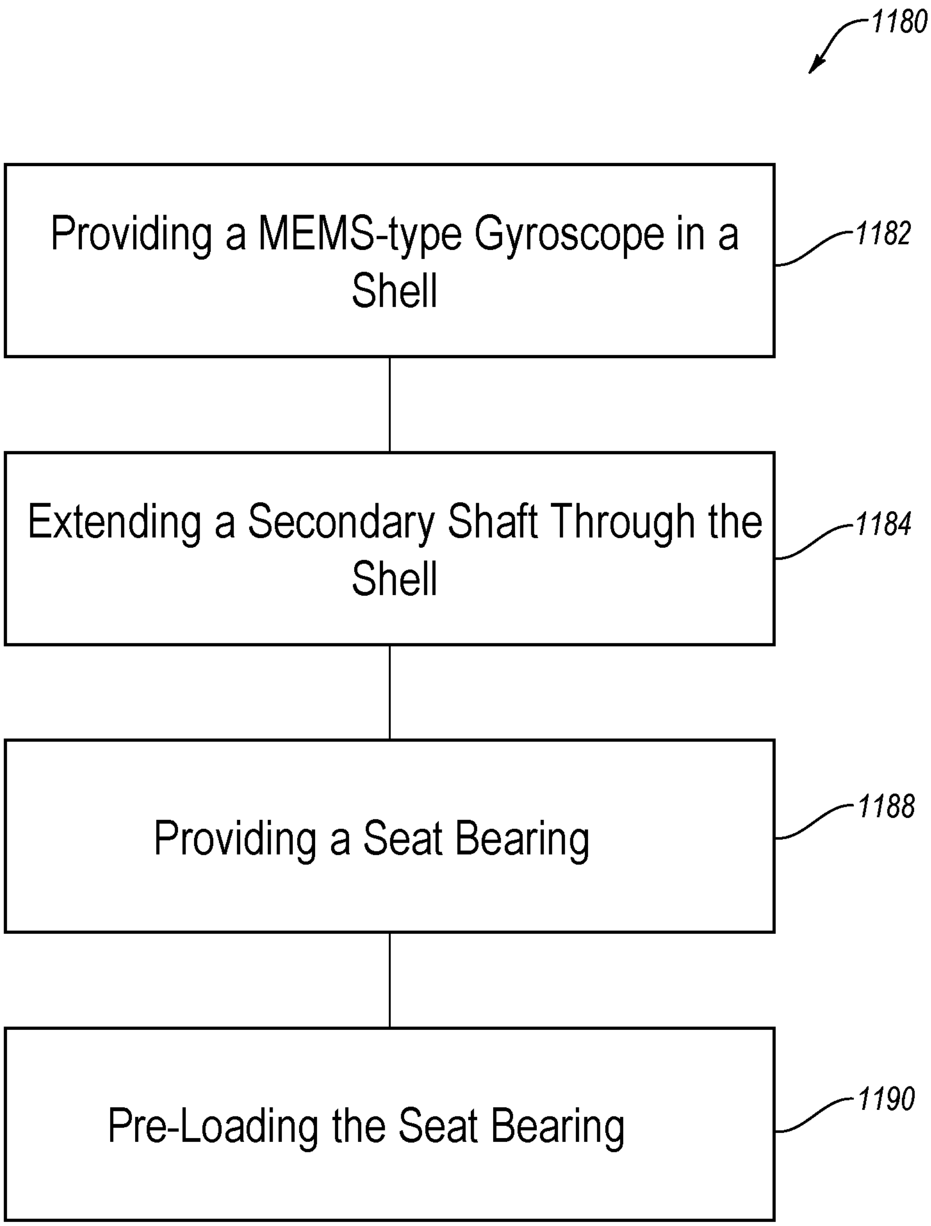
FIG. 11 is a representation of another method for assembling a gyroscopic sensor, according to at least one embodiment of the present disclosure.

FIG. 11 is a representation of a method 1180 for assembling a gyroscopic sensor, according to at least one embodiment of the present disclosure. The method includes providing a MEMS-type gyroscope in a shell at 1182. A secondary shaft may be extended through the shell at 1184. The secondary shaft is connected to a connection arm of a primary shaft at a first secondary shaft end. The secondary shaft further extends through a first shell bearing located between the shell and the connection arm and a second shell bearing opposite the shell from the first shell bearing. The second shell bearing is located at a second secondary shaft end.

The method further includes providing a seat bearing including a seat pad that is at least partially complementary to the shell at 1188. The method further includes pre-loading the seat bearing against the shell at 1190. In some embodiments, pre-loading the seat bearing includes applying a seat loading force of at least 500 N. The seat loading force may be applied with a seat biasing element. The method may further include sliding the shell across the seat pad while rotating the shell.

INDUSTRIAL APPLICABILITY

This disclosure generally relates to devices, systems, and methods for stabilizing a gyroscopic sensor. Bearings support multi-axis rotation of a MEMS-type gyroscope located in a shell. The shell rotates around a secondary shaft connected to an extension arm of a primary shaft. A biasing element pre-loads thrust bearings on either side of the shell against the extension arm, in at least one embodiment. This takes up space in the bearings to limit the amount of motion of the shell during operation of the sensor, thereby improving measurements made by the sensor.

The present disclosure includes a number of practical applications that provide benefits and/or solve problems associated with downhole drilling sensors. In at least one embodiment, as will be discussed in further detail herein, apparatuses, systems, and methods disclosed herein may reduce error-inducing movement from rotating downhole MEMS-type gyroscopic sensor. For instance, applying a compressive force against a shell housing the MEMS-type gyroscopic sensor may take up slack in its supporting thrust bearings. This may reduce axial motion of the shell, thereby improving measurements made by the MEMS-type gyroscopic sensor, in at least one embodiment.

In at least one embodiment, a primary shaft may be supported by a plurality of angular contact bearings. Applying a longitudinal force to the angular contact bearings, rotation of the primary shaft may pre-load the angular contact bearings. This may reduce any axial runout or wobble of the primary shaft. In this manner, the primary shaft may transfer rotational motion to the shell of the MEMS-type gyroscopic sensor that is more closely aligned with the longitudinal axis of the primary shaft. This may reduce wobble, eccentricity, or other motion transferred to the shell from the primary shaft. This may improve the accuracy of measurements collected by the MEMS-type gyroscopic sensor, in at least one embodiment.

In some embodiments, a drilling system includes a drill rig used to turn a drilling tool assembly which extends downward into the wellbore. The drilling tool assembly may include a drill string, along with a BHA and bit attached to the downhole end of drill string.

The drill string may include several joints of drill pipe connected end-to-end through tool joints. The drill string transmits drilling fluid through a central bore and transmits rotational power from the drill rig to the BHA. In some embodiments, the drill string may further include additional components such as subs, pup joints, etc. The drill pipe provides a hydraulic passage through which drilling fluid is pumped from the surface. The drilling fluid discharges through selected-size nozzles, jets, or other orifices in the bit for the purposes of cooling the bit and cutting structures thereon, and for lifting cuttings out of the wellbore as it is being drilled.

The BHA may include the bit or other components. An example BHA may include additional or other components (e.g., coupled between to the drill string and the bit). Examples of additional BHA components include drill collars, stabilizers, measurement-while-drilling MWD tools, LWD tools, downhole motors, underreamers, section mills, hydraulic disconnects, jars, vibration or dampening tools, other components, or combinations of the foregoing. The BHA 106 may further include an RSS. The RSS may include directional drilling tools that change a direction of the bit 110, and thereby the trajectory of the wellbore. At least a portion of the RSS may maintain a geostationary position relative to an absolute reference frame, such as gravity, magnetic north, and/or true north. Using measurements obtained with the geostationary position, the RSS may locate the bit, change the course of the bit, and direct the directional drilling tools on a projected trajectory.

According to embodiments of the present disclosure, a MEMS-type gyroscopic sensor may be located at the BHA. For example, the MEMS-type gyroscopic sensor may be located at an MWD, an LWD, an RSS, or other downhole tool of the BHA. In some embodiments, the MEMS-type gyroscopic sensor may be used to measure trajectory information used in directional drilling operations. For example, the MEMS-type gyroscopic sensor may be used to measure magnetic north, true (e.g., geographic) north.

In general, the drilling system may include other drilling components and accessories, such as special valves (e.g., kelly cocks, blowout preventers, and safety valves). Additional components included in the drilling system may be considered a part of the drilling tool assembly, the drill string, or a part of the BHA 106 depending on their locations in the drilling system.

The bit in the BHA may be any type of bit suitable for degrading downhole materials. For instance, the bit may be a drill bit suitable for drilling the earth formation. Example types of drill bits used for drilling earth formations are fixed-cutter or drag bits. In other embodiments, the bit may be a mill used for removing metal, composite, elastomer, other materials downhole, or combinations thereof. For instance, the bit may be used with a whipstock to mill into casing lining the wellbore. The bit may also be a junk mill used to mill away tools, plugs, cement, other materials within the wellbore, or combinations thereof. Swarf or other cuttings formed by use of a mill may be lifted to surface, or may be allowed to fall downhole.

In some embodiments, a sensor support apparatus includes a shell that encompasses a MEMS-type gyroscope. A primary shaft is rigidly (e.g., rotationally) connected to a connection arm. The connection arm may extend from a primary shaft first end of the primary shaft. A secondary shaft is rigidly (e.g., rotationally) connected to the connection arm of the primary shaft. It should be understood that the terms "primary" and "secondary" are used to differentiate two structures (e.g., the primary shaft and the secondary shaft), and do not provide any implication of relative importance, relevance, or criticality to the sensor support apparatus.

The secondary shaft extends through the shell. In some embodiments, shell may be inserted onto the secondary shaft through a central axis of the shell. The shell shown includes an indexing track that follows a circuitous route around an outer surface of the shell. An indexing pin may be inserted into the indexing track. In some embodiments, a rotary actuator may cause the primary shaft to rotate. This may cause the extension arm to rotate eccentrically (e.g., not coaxially with a longitudinal axis of the primary shaft). Rotating the extension arm eccentrically may cause the secondary shaft to rotate eccentrically relative to the longitudinal axis of the primary shaft. The eccentric rotation of the secondary shaft may cause the central axis of the shell to rotate with the secondary shaft. This may cause rotational motion in two axes relative to the center of the shell. An indexing pin may be inserted into the indexing track. As the shell rotates, the indexing pin may cause the shell to rotate about the secondary shaft. Thus, the shell may experience rotation along three different axes, thereby allowing six directions of measurements to be taken by the MEMS-type gyroscopic sensor located in the shell. In some embodiments, the shell may include a protrusion that extends into the extension arm. The protrusion may include a bearing that allows the shell to rotate without extending a secondary shaft through the shell.

During rotation of the shell, the shell may experience error-inducing movement that may reduce the accuracy of measurements from the MEMS-type gyroscopic sensor. For example, rotation of the shell about the secondary shaft is supported by a first shell bearing (e.g., a first secondary shaft bearing) and a second shell bearing (e.g., a second secondary shaft bearing). As the shell moves, the first shell bearing and/or the second shell bearing may experience movement along the length of the secondary shaft due to space between operating elements of the shell bearings, such as space between grooves and ball bearings in a deep-groove ball bearing. This may cause the shell to move along the secondary shaft. This error-inducing movement of the shell along the secondary shaft may reduce the accuracy and/or repeatability of measurements made by the MEMS-type gyroscopic sensor located in the shell.

In some embodiments, the primary shaft may experience error-inducing movement due to runout (e.g., eccentricity, non-centered rotation) from rotation of the primary shaft. This may cause the primary shaft to wobble, which error-inducing motion may be transferred to the connection arm, the secondary shaft, and the shell. This may reduce measurement accuracy and/or repeatability.

According to embodiments of the present disclosure, and as will be discussed in greater detail herein, a means for pre-loading one or more bearings supporting rotation and/or movement of the shell may reduce error-inducing movement of the shell caused by slack in bearings, runout, out-of-path rotation, or other error-inducing movements of the shell. For example, a biasing element may urge the second shell bearing against the shell, which may push against the first shell bearing and against the connection arm. This may take up some or all of the slack or play in the first shell bearing and/or the second shell bearing and reduce error-inducing movement of the shell along the secondary shaft.

In some examples, a biasing element may push urge one or more primary shaft bearings against a primary shaft shoulder on the primary shaft. This may tighten the primary shaft bearings against the primary shaft and a housing at least partially surrounding the primary shaft. This may reduce runout and/or wobble of the primary shaft, thereby reducing error-inducing motion of the shell.

In some embodiments, a sensor support apparatus shown includes a primary shaft connected to a connection arm. A secondary shaft is inserted through a shell and rigidly connected to the connection arm. An indexing pin is inserted into an indexing track. The indexing pin is biased into the indexing track with an indexing pin resilient member (e.g., a spring, a diaphragm) to maintain contact of the indexing pin with the indexing track.

A MEMS-type gyroscope is housed (e.g., located) within the shell. The MEMS-type gyroscope may be any MEMS-type gyroscope. For example, the MEMS-type gyroscope may include a ring that is vibrated in response to an applied electromagnetic field. The movement of the shell may cause the MEMS-type gyroscope to apply force to a mounting block. The force may be measured and analyzed to determine the forces acting on the gyroscope. By knowing the rotational forces applied by the rotation of the primary shaft, the secondary shaft, and the shell, the orientation of geographic north may be determined based on the measured angular acceleration (e.g., the Coriolis acceleration) applied from rotation of the earth. To reduce outside magnetic interference (e.g., from the earth's magnetic field and/or from other tools on a BHA), the shell may be made from a magnetically permeable material, thereby magnetically shielding the shell.

As the shell rotates about a secondary shaft axis of the secondary shaft, the shell may experience error-inducing movement. For example, the shell may experience longitudinal error-inducing movement (e.g., parallel to the secondary shaft axis). In some examples, the shell may experience radial error-inducing movement (e.g., transverse or perpendicular to the secondary shaft axis). The rotation of the shell about the secondary shaft axis may be supported using one or more shell bearings (e.g., secondary shaft bearings). For example, a first shell bearing may be located at a secondary shaft first end between the shell and the connection arm and a second shell bearing may be located at a secondary shaft second end.

In some embodiments, the first shell bearing and the second shell bearing may be any type of bearing. In some embodiments, the first shell bearing and/or the second shell bearing may support both longitudinal movement and radial movement. For example, the first shell bearing and/or the second shell bearing may be ball bearings, deep-groove ball bearings, angular contact ball bearings, needle bearings, roller bearings, needle bearings, any other type of bearing, and combinations thereof. In some embodiments, the first shell bearing and/or the second shell bearing may only support longitudinal motion. For example, the first shell bearing and/or the second shell bearing may be thrust bearings. In some embodiments, it may be critical that the first shell bearing and the second shell bearing are thrust bearings to withstand and operate under a loading force applied by the biasing element.

In some embodiments, the first shell bearing and the second shell bearing may be pre-loaded using a biasing element. The biasing element may be located at the secondary shaft second end. The biasing element may apply a loading force to the second shell bearing. The second shell bearing may apply (e.g., transfer) the loading force to the shell. The shell may apply (e.g., transfer) the loading force to the first shell bearing. The first shell bearing may apply (e.g., transfer) the loading force to the connection arm. The loading force may take up any slack in the first shell bearing and/or the second shell bearing. This may help to prevent error-inducing movement of the shell.

In some embodiments, the loading force may be in a range having an upper value, a lower value, or upper and lower values including any of 50 N, 100 N, 200 N, 300 N, 400 N, 500 N, 600 N, 700 N, 800 N, 900 N, 1,000 N, 1,100 N, 1,200 N, 1,300 N, 1,400 N, 1,500 N, or any value therebetween. For example, the loading force may be greater than 50 N. In another example, the loading force may be less than 1,500 N. In yet other examples, the loading force may be any value in a range between 50 N and 1,500 N. In some embodiments, it may be critical that the loading force is greater than 500 N to reduce error-inducing movement of the shell.

In the embodiment shown, the secondary shaft includes a retaining member. In some embodiments, the retaining member may be mechanically attached to the secondary shaft. For example, the retaining member may include a nut, a washer, a locking pin, a retaining clip, any other type of mechanical fastener or attachment, and combinations thereof. In some embodiments, the retaining member may be permanently attached to the secondary shaft. For example, the retaining member may be welded, brazed, or otherwise permanently attached to the secondary shaft.

In some embodiments, the biasing element may be located between the retaining member and the second shell bearing. The biasing element may exert a spreading force between the retaining member and the second shell bearing. This may place the secondary shaft in tension. Furthermore, this may place the shell bearings and the shell in compression. In this manner, the shell bearings are pre-loaded by the biasing element.

In some embodiments, the biasing element may include any biasing element. For example, the biasing element may include an elastically deformable material. In some examples, the biasing element may include a piston, such as a hydraulic piston, a pneumatic piston, or other piston element. In some examples, the biasing element may include a resilient member, such as a spring, a coil spring, one or more Belleville washers. In some embodiments, the biasing element may include a resilient member and the retaining member may include a nut threaded onto the secondary shaft second end. The loading force may be increased or decreased based on the extent to which the retaining member is threaded onto the secondary shaft.

In some embodiments, the first shell bearing may include more than one bearing. For example, the first shell bearing may include a thrust bearing and an angular contact bearing. In some embodiments, the second shell bearing may include more than one bearing. For example, the second shell bearing may include a thrust bearing and a deep groove ball bearing.

In some embodiments, a third shell bearing may be located inside of the shell. For example, the third shell bearing may be located in a secondary shaft middle section. In some embodiments, the third shell bearing may include any type of bearing, including a ball bearing, a journal bearing, or any other type of bearing. The third shell bearing may provide support for radial movement of the shell as it rotates about the secondary shaft axis. In some embodiments, utilizing a third shell bearing that is a journal bearing in combination with a first shell bearing and a second shell bearing that are thrust bearings may allow for an increased loading force while supporting axial movement and motion of the shell against the secondary shaft. This may reduce error-inducing movement, thereby improving sensor measurement accuracy and repeatability.

In some embodiments, rotation of the primary shaft about a primary shaft axis may be supported by one or more primary shaft bearings. In some embodiments, the primary shaft bearings may help to prevent runout or wobble of the primary shaft about the primary shaft axis. In some embodiments, the primary shaft bearings may be pre-loaded using one or more biasing elements, as will be discussed in further detail herein.

In some embodiments, the secondary shaft is inserted into the connection arm. The secondary shaft may be fixed to the connection arm using any connection method, including a threaded connection, weld, braze, adhesive, any other type of connection, and combinations thereof. As may be seen, the secondary shaft is inserted through the shell, a first shell bearing (e.g., a secondary shaft first bearing), a second shell bearing (e.g., a secondary shaft second bearing), and a third shell bearing (e.g., a secondary shaft third bearing).

In the embodiment shown, the first shell bearing and the second shell bearings are thrust bearings, and the third shell bearing is a journal bearing. A biasing element places the first shell bearing, the second shell bearing, and the shell under compression. The biasing element shown is a series of Belleville washers. The second shell bearing abuts (e.g., directly contacts) a second shell shoulder at a shell second end. The first shell bearing abuts (e.g., directly contacts) a first shell shoulder at a shell first end. The first shell bearing further abuts (e.g., directly contacts) the connection arm at a connection arm shoulder. The first shell shoulder, the second shell shoulder, and the connection arm shoulder may provide secure surfaces for the first shell bearing and the second shell bearing. This may allow the shell to rotate relative to the biasing element, the secondary shaft, and the connection arm. Furthermore, these shoulders may provide a secure surface for the biasing element to apply the loading force during pre-loading.

In some embodiments, a shell is located in a housing. The housing may be the housing for a BHA, or may be located in a BHA. In this manner, the sensor support apparatus may be deployed downhole. This may allow a MEMS-type gyroscope to take trajectory measurements downhole.

As discussed above, in some embodiments, rotation of the primary shaft may be supported by one or more primary shaft bearings. The primary shaft bearings may include an inner member and an outer member. The inner member may contact the primary shaft and the outer member may contact the housing at a housing shoulder. In some embodiments, movement between the inner member and the outer member during rotation may allow the primary shaft to wobble or experience error-inducing movement.

To reduce error-inducing movement, the one or more primary shaft bearings may be pre-loaded. In some embodiments, the inner member may be pre-loaded separately from the outer member. For example, the inner member may be pre-loaded with an inner loading force by an inner member biasing element. The inner member biasing element may urge the inner member against a primary shaft shoulder with the inner loading force. In the embodiment shown, the inner member biasing element is a ring threaded onto the primary shaft. As the inner member biasing element is threaded further onto the shaft, the inner member biasing element may apply a loading force to the primary shaft shoulder through the inner member. In some embodiments, the inner member biasing element may be any biasing element, including a resilient member (e.g., a spring), a hydraulic piston, a pneumatic piston, or any other biasing element.

An outer member biasing element may pre-load the outer member against a housing shoulder with an outer loading force. In the embodiment shown, the outer member biasing element is a housing or other element that is connected to the housing with one or more mechanical fasteners, which apply the outer loading force as the mechanical fasteners are tightened. In some embodiments, the outer member biasing element may be any biasing element, including a threaded nut or ring, a resilient member (e.g., a spring), a hydraulic piston, a pneumatic piston, or any other biasing element.

In some embodiments, the primary shaft bearings may be angular contact bearings. In this manner, at least one of the outer member or the inner member may have an angled (e.g., slanted) ball bearing contact surface. By pre-loading the inner member and the outer member, the angled ball bearing contact surface may slide along the bearing until all the slack, play, or extra distance in the primary shaft bearing is removed. This may help to center the primary shaft. In some embodiments, the angled ball bearing contact surface may be located on the inner member. In some embodiments, the angled ball bearing contact surface may be located on the outer member. In the embodiment shown, the angled ball bearing contact surface is located on the outer member. In some embodiments, multiple primary shaft bearings may all have an angled ball bearing contact surface on the outer member or the inner member. In some embodiments, a first primary shaft bearing may have an angled ball bearing contact surface on the outer member and a second primary shaft bearing may have an angled ball bearing contact surface on the inner member and vice versa. In some embodiments, each angled ball bearing contact surface may angle in the same direction (e.g., radially outward toward or away from the shell). In some embodiments, a first primary shaft bearing may have an angled ball bearing contact surface angled radially outward toward the shell and a second primary shaft bearing may have an angled ball bearing contact surface angled radially away from the shell, and vice versa.

In some embodiments, a first primary shaft bearing and a second primary shaft bearing are connected to the primary shaft at housing first end of a primary shaft section of a housing, near an extension arm. In the embodiment shown, the first primary shaft bearing is adjacent to the second primary shaft bearing. In the embodiment shown, the both the first primary shaft bearing and the second primary shaft bearing are angle contact bearings. In some embodiments, the primary shaft bearings may be pre-loaded using the same biasing element (e.g., inner biasing element and/or outer biasing element).

In some embodiments, the first primary shaft bearing is offset from the second primary shaft bearing. The first primary shaft bearing may be located at the housing first end and the second primary shaft bearing may be located at or closer to a housing second end than the housing first end. The first primary shaft bearing is spaced apart from (e.g., not touching) the second primary shaft bearing. In some embodiments, the first primary shaft bearing and the second primary shaft bearing are preloaded. In some embodiments, the first primary shaft bearing is pre-loaded using a different biasing element than the second primary shaft bearing. Locating the shaft bearings at different ends of the housing may stabilize the primary shaft from more than one location. This may help to reduce wobble and/or runout of the primary shaft during operation.

In some embodiments, the first primary shaft bearing is located at the housing first end and the second primary shaft bearing is located at the housing second end. A third primary shaft bearing is located adjacent to (e.g., in contact with) the second primary shaft bearing. In some embodiments, the third primary shaft bearing may be a different type of bearing than one or both of the first primary shaft bearing or the second primary shaft bearing. For example, the third primary shaft bearing may be a needle bearing, and the second primary shaft bearing may be an angular contact bearing. Locating different types of primary shaft bearings adjacent to each other may provide multiple types of support for the primary shaft. For example, a needle bearing third primary shaft bearing may provide good radial support and a deep groove ball bearing second primary shaft bearing may provide good longitudinal support. This may help to further stabilize the primary shaft. While the third primary shaft bearing is described as adjacent to the second primary shaft bearing, it should be understood that the third primary shaft earing may be located adjacent to the first primary shaft bearing.

In some embodiments, the first primary shaft bearing is located at the housing first end and the second primary shaft bearing is located at the housing second end. The third primary shaft bearing is located adjacent to (e.g., in contact with) the second primary shaft bearing, and a fourth primary shaft bearing is located adjacent to (e.g., in contact with) the first primary shaft bearing. In some embodiments, the fourth primary shaft bearing may be a different type of bearing than the first primary shaft bearing. For example, the fourth primary shaft bearing may be an angular contact bearing and the first primary shaft bearing may be a thrust bearing. Locating a fourth primary shaft bearing adjacent to the first primary shaft bearing and a third primary shaft bearing adjacent to the second primary shaft bearing may provide multiple types of support for the primary shaft, thereby reducing wobble and runout from rotation of the primary shaft.

In some embodiments, a sensor support apparatus includes a shell that encompasses a MEMS-type gyroscope. A primary shaft is rigidly (e.g., rotationally) connected to a connection arm. A secondary shaft is rigidly (e.g., rotationally) connected to the connection arm of the primary shaft. The secondary shaft extends through the shell. In some embodiments, shell may be inserted onto the secondary shaft through a central axis of the shell.

The shell shown includes an indexing track that follows a circuitous route around an outer surface of the shell. An indexing pin may be inserted into the indexing track. In some embodiments, a rotary actuator may cause the primary shaft to rotate. This may cause the extension arm to rotate to rotate eccentrically (e.g., not coaxially with a longitudinal axis of the primary shaft). Rotating the extension arm eccentrically may cause the secondary shaft to rotate eccentrically relative to the longitudinal axis of the primary shaft. The eccentric rotation of the secondary shaft may cause the central axis of the shell to rotate with the secondary shaft. This may cause rotational motion in two axes relative to the center of the shell. An indexing pin may be inserted into the indexing track. As the shell rotates, the indexing pin may cause the shell to rotate about the secondary shaft. Thus, the shell may experience rotation along three different axes, thereby allowing six directions of measurements to be taken by the MEMS-type gyroscopic sensor located in the shell.

In the embodiment shown, a seat bearing supports rotation of the shell. The seat bearing includes a seat pad that has a seat profile that at least partially matches an outer profile of the shell. In other words, because the shell is spherical, the seat pad has a radius of curvature that matches the outer radius of the shell. This may allow the shell to rotate freely about different axes on the seat pad.

A seat biasing element pre-loads (e.g., biases) the seat bearing against the shell. Pre-loading the seat bearing may help to reduce error-inducing movement by the shell. This may improve measurement accuracy and/or repeatability by a MEMS-type gyroscopic sensor located in the shell. In the embodiment shown, the seat biasing element is a coil spring. In some embodiments, the seat biasing element may be any type of biasing element, including a wave spring, a hydraulic piston, a pneumatic piston, an elastically deformable material, an electromechanical motor, a linear motor, a solenoid, a worm gear, a piezoelectric stack, any other type of biasing element, and combinations thereof.

In the embodiment shown, the seat bearing is pre-loaded against the shell with a seat biasing element. In some embodiments, the seat biasing element may pre-load the seat bearing with a seat loading force. In some embodiments, the seat loading force may be in a range having an upper value, a lower value, or upper and lower values including any of 5 N, 10 N, 20 N, 30 N, 50 N, 100 N, 200 N, 300 N, 400 N, 500 N, or any value therebetween. For example, the seat loading force may be greater than 5 N. In another example, the seat loading force may be less than 500 N. In yet other examples, the seat loading force may be any value in a range between 5 N and 500 N. Pre-loading the seat bearing may support the shell during rotation of the shell. In some embodiments, pre-loading the seat bearing may support the shell during high vibration downhole drilling operations. For example, while drilling, the primary shaft may not rotate, but the sensor support apparatus may experience shock and vibration forces caused by drilling activities. Pre-loading the seat bearing may help to reduce damage to the sensor support apparatus, including bending components and/or damaging the MEMS-type gyroscope. This may help to improve accuracy and/or repeatability of measurements by preventing damage that may place the MEMS-type gyroscope out of calibration. In some embodiments, it may be critical that the seat loading force is greater than 50 N to protect the sensor support apparatus from shock and vibration damage.

In some embodiments, a seat bearing includes a seat pad located at a seat bearing first end of a seat body. The seat pad may be configured to abut (e.g., contact) a shell. Thus, the seat pad may have a spherical surface that matches the surface profile of the shell. A biasing element may contact the second end of the body to urge the seat bearing to the shell.

The seat pad may be formed from a low-friction material. For example, the seat pad may be formed fully or partially from PTFE, aluminum, bronze, a PTFE filled polymer, or a combination thereof. A low-friction material may help reduce friction between the shell and the seat pad. This may help reduce the torque required to rotate the primary shaft. In some embodiments, the seat pad may be formed from the same material as the seat body. In some embodiments, the seat pad may be formed from a different material than the seat body.

In some embodiments, the seat pad may have a seat pad area. The seat pad area may be the surface area of the seat pad. The shell has a shell surface area, which is the shell surface area of the outer surface of the shell. In some embodiments, the seat pad area is a pad area percentage of the shell surface area. In some embodiments, the pad area percentage may be in a range having an upper value, a lower value, or upper and lower values including any of 1%, 2%, 3%, 4%, 5%, 10%, 15%, 20%, 25%, 30%, 35%, 40%, 45%, 50%, or any value therebetween. For example, the pad area percentage may be greater than 1%. In another example, the pad area percentage may be less than 50%. In yet other examples, the pad area percentage may be any value in a range between 1% and 50%. In some embodiments, it may be critical that the pad area percentage is less than 50% to easily secure and support the seat bearing to the shell.

In some embodiments, the seat pad may have an arc length, which is the arc length of seat pad material along from the longitudinal axis of the seat pad between a leading edge and a trailing edge of the seat pad. In some embodiments, the arc length may be in a range having an upper value, a lower value, or upper and lower values including any of 0.1°, 0.5°, 1.0°, 2.5°, 5.0°, 10°, 15°, 20°, 30°, 45°, 60°, 75°, 90°, or any value therebetween. For example, the arc length may be greater than 0.1°. In another example, the arc length may be less than 90°. In yet other examples, the arc length may be any value in a range between 0.1° and 90°. In some embodiments, it may be critical that the arc length is less than 90° to easily secure and remove the seat bearing to the shell.

In some embodiments, the seat pad may include one or more seat pad gaps. The seat pad gaps may be recessed sections of the seat pad that do not contact the shell. A circumferential contact arc length is a total arc length of the seat pad that contacts the shell (e.g., subtracting out any seat pad gaps). In some embodiments, the circumferential contact arc length may be in a range having an upper value, a lower value, or upper and lower values including any of 0.1°, 0.5°, 1.0°, 2.5°, 5.0°, 10°, 15°, 20°, 30°, 45°, 60°, 90°, 120°, 150°, 180°, 210°, 240°, 270°, 300°, 330°, 360°, or any value therebetween. For example, the circumferential arc length may be greater than 0.1°. In another example, the circumferential arc length may be less than 360°. In yet other examples, the circumferential arc length may be any value in a range between 0.1° and 360°. In some embodiments, it may be critical that the circumferential arc length is less than 180° to easily secure and remove the seat bearing to the shell.

In some embodiments, a leading edge diameter of the leading edge may be a leading edge percentage of a maximum diameter of the shell. In some embodiments, the leading edge percentage may be in a range having an upper value, a lower value, or upper and lower values including any of 1%, 2%, 5%, 10%, 15%, 20%, 25%, 30%, 35%, 40%, 45%, 50%, or any value therebetween. For example, the leading edge percentage may be greater than 1%. In another example, the leading edge percentage may be less than 50%. In yet other examples, the leading edge percentage may be any value in a range between 1% and 50%. In some embodiments, it may be critical that the leading edge percentage is less than 50% to easily secure and remove the seat bearing to the shell.

In some embodiments, a trailing edge diameter of the trailing edge may be a trailing edge percentage of the maximum diameter of the shell. In some embodiments, the trailing edge percentage may be in a range having an upper value, a lower value, or upper and lower values including any of 1%, 5%, 10%, 15%, 20%, 25%, 30%, 35%, 40%, or any value therebetween. For example, the leading edge percentage may be greater than 1%. In another example, the trailing edge percentage may be less than 40%. In yet other examples, the trailing edge percentage may be any value in a range between 1% and 40%. In some embodiments, it may be critical that the trailing edge percentage is less than 40% to easily secure and remove the seat bearing to the shell.

In some embodiments, a seat bearing contacts the shell with a seat pad. The seat pad has a seat pad profile that is at least partially complementary to a shell profile of the shell. Because the shell has a spherical outer profile, the seat pad profile is at least partially spherical (e.g., has a seat pad radius of curvature that is the same as a shell outer radius of curvature). In some embodiments, the seat pad profile has a radius of curvature that is larger than the radius of curvature of the shell.

In some embodiments, the shell slides relative to the seat pad. In other words, the seat bearing is a static bearing, meaning that the seat bearing or the seat pad do not move as the shell moves. For example, a seat body and/or the seat pad of the seat bearing may not rotate relative to the shell. In some embodiments, at least a portion of the seat bearing moves as the shell moves. For example, the seat body of the seat bearing may rotate relative to the shell. In some examples, the seat pad may rotate relative to the seat body and the shell.

In some embodiments, the seat pad may contact the shell with a running fit (ISO H8/h7, H9/e9, H9/d9). In some embodiments, the seat pad may contact the shell with a sliding fit (ISO H7/g6). For example, the seat pad profile may have a radius of curvature difference between the seat pad radius of curvature and the radius of curvature of the shell 814. In some embodiments, the radius of curvature difference may be in a range having an upper value, a lower value, or upper and lower values including any of +/−0.05 mm, 0.1 mm, 0.2 mm, 0.3 mm, 0.4 mm, 0.5 mm, 0.6 mm, 0.7 mm, 0.8 mm, 0.9 mm, 1.0 mm or any value therebetween. For example, the radius of curvature difference may be greater than 0.05 mm. In another example, the radius of curvature difference may be less than 1.0 mm. In yet other examples, the radius of curvature difference may be any value in a range between 0.05 mm and 1.0 mm. In some embodiments, it may be critical that the radius of curvature difference is less than 0.5 mm to provide support to the shell 814.

In some embodiments, each of the bearings supporting a shell are pre-loaded. For example, a pair of primary shaft bearings are pre-loaded with a primary shaft biasing element. A set of shell bearings are pre-loaded with a shell biasing element. And a seat bearing is pre-loaded with a seat biasing element. In this manner, the shell and the MEMS-type gyroscope housed within may be supported during both operation (e.g., when the shell is rotating) and during drilling operations (e.g., high shock and vibration loading). This may help to improve the accuracy and/or repeatability of measurements taken by the MEMS-type gyroscope.

In some embodiments, method for assembling a gyroscopic sensor includes providing a MEMS-type gyroscope in a shell. A secondary shaft may be extended through the shell. The secondary shaft is connected to a connection arm of a primary shaft at a first secondary shaft end. The secondary shaft further extends through a first shell bearing located between the shell and the connection arm and a second shell bearing opposite the shell from the first shell bearing. The second shell bearing is located at a second secondary shaft end.

The method further includes pre-loading the first bearing and the second bearing. In some embodiments, pre-loading the first bearing and the second bearing includes applying a loading force to the second bearing. The loading force may be applied with a biasing element. The biasing element may transfer the loading force through the second bearing, the shell, the first bearing, to the connection arm. In some embodiments, the loading force may place the shell under compression and the secondary shaft under tension.

In some embodiments, the method may include securing a retaining member to the second secondary shaft end. The retaining member may contact the biasing element to apply the loading force. In some embodiments, securing the retaining member may include threading a nut onto the second secondary shaft end. In some embodiments, pre-loading the first bearing and the second bearing includes preloading with a loading force of at least 500 N.

In some embodiments, a method for assembling a gyroscopic sensor includes providing a MEMS-type gyroscope in a shell. A secondary shaft may be extended through the shell. The secondary shaft is connected to a connection arm of a primary shaft at a first secondary shaft end. The secondary shaft further extends through a first shell bearing located between the shell and the connection arm and a second shell bearing opposite the shell from the first shell bearing. The second shell bearing is located at a second secondary shaft end.

The method further includes providing a seat bearing including a seat pad that is at least partially complementary to the shell. The method further includes pre-loading the seat bearing against the shell. In some embodiments, pre-loading the seat bearing includes applying a seat loading force of at least 500 N. The seat loading force may be applied with a seat biasing element. The method may further include sliding the shell across the seat pad while rotating the shell.

The following are aspects of devices, systems, and methods consistent with embodiments of the present disclosure.

In a first aspect, a sensor support apparatus includes a shell configured to encompass a MEMS-type gyroscope, a primary shaft including a connection arm, a secondary shaft rigidly connected to the primary shaft at the connection arm and extending through the shell; one or more bearings supporting rotation of at least one of the primary shaft or the shell around the secondary shaft, and a means for pre-loading the one or more bearings.

In a second aspect that can include the first aspect, the means for pre-loading the one or more bearings applies a loading force of at least 500 N.

In a third aspect that includes one or more of the first or second aspects, the one or more bearings include a thrust bearing between the shell and the connection arm.

In a fourth aspect that includes one or more of the first through third aspects, the primary shaft is connected to a rotary actuator configured to rotate the primary shaft.

In a fifth aspect that includes one or more of the first through fourth aspects, the shell includes a slot around an outer surface of the shell, and further includes an indexing pin inserted into the slot, the indexing pin being biased into the pin with a pin resilient member.

In a sixth aspect, a system for supporting a sensor includes a shell configured to encompass a MEMS-type gyroscope; a primary shaft including a connection arm, a secondary shaft rigidly connected to the connection arm at a secondary shaft first end, a secondary shaft second end extending through the shell at a shaft middle section; and a secondary shaft bearing. The secondary shaft bearing includes a first shell bearing at the secondary shaft first end, the first shell bearing being located between the shell and the connection arm; a retaining member at the secondary shaft second end; a second shell bearing between the retaining member and the shell; and a biasing element exerting a secondary loading force between the retaining member and the second shell bearing.

In a seventh aspect that can include the first aspect, the first shell bearing and the second shell bearing are thrust bearings.

In an eighth aspect that can include the sixth or seventh aspect, the system further includes a third shell bearing at the shaft middle section between the secondary shaft and the shell.

In a ninth aspect that can include the eighth aspect, the third shell bearing is a journal bearing.

In a tenth aspect that can include any of the sixth through ninth aspects, the primary shaft includes a primary shaft shoulder, and the system further includes a housing surrounding at least a portion of the primary shaft, the housing including a housing shoulder; and a primary shaft bearing assembly. The primary shaft bearing assembly includes a primary shaft bearing between the primary shaft and the housing, the primary shaft bearing including an inner member and an outer member; an inner loading member configured to apply an inner loading force on the inner member against the primary shaft shoulder; and an outer loading member configured to apply an outer loading force on the outer member against the housing shoulder.

In an eleventh aspect that can include the tenth aspect, the primary shaft bearing is an angle contact bearing.

In a twelfth aspect that can include the tenth or eleventh aspect, the inner loading member includes a ring threaded onto the primary shaft.

In a thirteenth aspect that can include any of the tenth through twelfth the outer loading member includes a second housing connected to the housing.

In a fourteenth aspect that can include any of the tenth through thirteenth aspects, the primary shaft bearing is a first primary shaft bearing, and the system further includes a second primary shaft bearing between the inner loading member and the first primary shaft bearing.

In a fifteenth aspect, a method for assembling a gyroscopic sensor includes providing a MEMS-type gyroscope in a shell; extending a secondary shaft through the shell, wherein the secondary shaft is rigidly connected to a connection arm on a primary shaft at a first shaft end, wherein extending the secondary shaft through the shell includes extending the secondary shaft through a first bearing between the shell and the connection arm and extending the secondary shaft through a second bearing opposite the shell from the first bearing, the second bearing being located at a second shaft end; and pre-loading the first bearing and the second bearing with a biasing element.

In a sixteenth aspect that can include the fifteenth aspect, pre-loading the first bearing and the second bearing includes applying a loading force to the second bearing with the biasing element, the loading force transferring through the shell to the first bearing and through the first bearing to the connection arm.

In a seventeenth aspect that can include the sixteenth aspect, the loading force places the shell under compression and the secondary shaft under tension.

In a twentieth aspect that can include the sixteenth or seventeenth aspects, the method further includes securing a retaining member to the secondary shaft on the second shaft end, the retaining member contacting the biasing element to apply the loading force.

In a nineteenth aspect that can include the eighteenth aspect, securing the retaining member includes threading a nut onto the second shaft end.

In a twentieth aspect that can include any of the fifteenth through nineteenth aspects, pre-loading the first bearing and the second bearing includes pre-loading the first bearing and the second bearing with a loading force of at least 500 N.

In a twenty-first aspect, a sensor support apparatus includes a shell configured to encompass a mems-type gyroscope, the shell including a spherical shell profile; and a seat bearing including a seat pad with a seat profile that is at least partially complementary to the spherical shell profile, wherein the seat bearing has an arc length that is less than 90°.

In a twenty-second aspect that can include the twenty-first aspect, the apparatus further includes a seat biasing element that pre-loads the seat pad to the shell.

In a twenty-third aspect that can include the twenty-second aspect, the seat biasing element includes a coil spring.

In a twenty-fourth aspect that can include any of the twenty-first through twenty-third aspects, the seat pad is formed from a low-friction material.

In a twenty-fifth aspect that can include the twenty-fourth aspect, the low-friction material includes at least one of PTFE, aluminum, bronze, or a PTFE filled polymer.

In a twenty-sixth aspect that can include any of the twenty-first through twenty-fifth aspects, the seat pad is formed from a different material than a body of the seat bearing.

In a twenty-seventh aspect that can include any of the twenty-first through twenty-sixth aspects, the seat pad connects to the shell with a sliding fit.

In a twenty-eighth aspect that can include any of the twenty-first through twenty-seventh aspects, the seat pad connects to the shell with a running fit.

In a twenty-ninth aspect that can include any of the twenty-first through twenty-eighth aspects, the seat pad rotates relative to a body of the seat bearing.

In a thirtieth aspect that can include any of the twenty-first through twenty-ninth aspects, the apparatus further includes a housing encompassing the shell and the seat, wherein the seat bearing is longitudinally movable within the housing.

In a thirty-first aspect that can include any of the twenty-first through thirtieth aspects, the apparatus further includes a housing encompassing the shell and the seat, wherein the seat bearing is rotatable within the housing.

In a thirty-second aspect, a system for housing a sensor includes a shell configured to encompass a mems-type gyroscope and including a spherical shell profile; a primary shaft including a connection arm; a secondary shaft rigidly connected to the connection arm at a shaft first end, a shaft second end extending through the shell at a shaft middle section; a secondary shaft bearing; and a seat bearing including a seat pad with a seat profile that is at least partially complementary to the spherical shell profile. The secondary shaft bearing can also include a first shell bearing at the shaft first end, the first bearing being located between the shell and the connection arm; a retaining member at the shaft second end; a second shell bearing between the retaining member and the shell; and a biasing element exerting a loading force between the retaining member and the second shell bearing.

In a thirty-third aspect that can include the thirty-second aspect, the system includes a seat biasing element pre-loading the seat pad to the shell second end.

In a thirty-fourth aspect that includes the thirty-second or thirty-third aspects, the primary shaft includes a primary shaft shoulder, and further includes a housing surrounding at least a portion of the primary shaft, the housing including a housing shoulder; and a primary shaft bearing assembly, including: a primary shaft bearing between the primary shaft and the housing, the primary shaft bearing including an inner member and an outer member; an inner loading member configured to apply an inner loading force on the inner member against the primary shaft shoulder; and an outer loading member configured to apply an outer loading force on the outer member against the housing shoulder.

In a thirty-fifth aspect that can include any of the thirty-second through thirty-fourth aspects, the system includes a housing encompassing the shell, at least a portion of the primary shaft, the secondary shaft, and the seat, wherein the seat bearing is longitudinally movable within the housing.

In a thirty-sixth aspect, a method for assembling a gyroscopic sensor includes providing a mems-type gyroscope in a shell; extending a secondary shaft through the shell, wherein the secondary shaft is rigidly connected to a connection arm on a primary shaft at a first shaft end, wherein extending the secondary shaft through the shell includes extending the secondary shaft through a first bearing between the shell and the connection arm and extending the secondary shaft through a second bearing opposite the shell from the first bearing, the second bearing being located at a second shaft end; providing a seat bearing including a seat pad at least partially complementary to the shell; and pre-loading the seat bearing against the shell.

In a thirty-seventh aspect that can include the thirty-sixth aspect, pre-loading the seat bearing against the shell includes applying a seat loading force of at least 500 N.

In a thirty-eighth aspect that includes one or more of the thirty-sixth or thirty-seventh aspects, pre-loading the seat bearing includes pushing the seat bearing against the shell with a seat biasing element.

In a thirty-ninth aspect that can include any of the thirty-sixth through thirty-eight aspects, a method includes pre-loading the first bearing and the second bearing.

In a fortieth aspect that can include any of the thirty-sixth through thirty-ninth aspects, a method includes sliding the shell across the seat pad while rotating the shell.

The embodiments of the sensor support apparatus have been primarily described with reference to wellbore drilling operations; the sensor support apparatuses described herein may be used in applications other than the drilling of a wellbore. In other embodiments, sensor support apparatuses according to the present disclosure may be used outside a wellbore or other downhole environment used for the exploration or production of natural resources. For instance, sensor support apparatuses of the present disclosure may be used in a borehole used for placement of utility lines. Accordingly, the terms "wellbore," "borehole" and the like should not be interpreted to limit tools, systems, assemblies, or methods of the present disclosure to any particular industry, field, or environment.

One or more specific embodiments of the present disclosure are described herein. These described embodiments are examples of the presently disclosed techniques. Additionally, in an effort to provide a concise description of these embodiments, not all features of an actual embodiment may be described in the specification. It should be appreciated that in the development of any such actual implementation, as in any engineering or design project, numerous embodiment-specific decisions will be made to achieve the developers' specific goals, such as compliance with system-related and business-related constraints, which may vary from one embodiment to another. Moreover, it should be appreciated that such a development effort might be complex and time consuming, but would nevertheless be a routine undertaking of design, fabrication, and manufacture for those of ordinary skill having the benefit of this disclosure.

Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that is within standard manufacturing or process tolerances, or which still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A sensor support apparatus, comprising:

a shell configured to encompass a MEMS-type gyroscope;

a primary shaft including a connection arm;

a secondary shaft rigidly connected to the primary shaft at the connection arm and extending through the shell;

one or more bearings supporting rotation of at least one of the primary shaft or the shell around the secondary shaft, the one or more bearings including a thrust bearing between the shell and the connection arm; and a means for pre-loading the one or more bearings.

2. The apparatus of claim 1, wherein the means for pre-loading the one or more bearings applies a loading force of at least 500 N.

3. The apparatus of claim 1, the primary shaft being connected to a rotary actuator arranged and designed to rotate the primary shaft.

4. The apparatus of claim 1, the shell including a slot around at least a portion of an outer surface of the shell, the apparatus further comprising an indexing pin inserted into the slot, the indexing pin being biased into the pin with a pin resilient member.

5. A system for supporting a sensor, comprising:

a shell encompassing a gyroscope;

a primary shaft including a connection arm;

a secondary shaft extending through the shell, the secondary shaft rigidly connected to the connection arm at a secondary shaft first end opposite a secondary shaft second end; and a secondary shaft bearing, including:

- a first shell bearing at the secondary shaft first end, the first shell bearing being located between the shell and the connection arm;
- a retaining member at the secondary shaft second end;
- a second shell bearing between the retaining member and the shell; and
- a biasing element exerting a secondary loading force between the retaining member and the second shell bearing.

6. The system of claim 5, the first shell bearing and the second shell bearing including thrust bearings.

7. The system of claim 5, further comprising a third shell bearing between the secondary shaft and the shell, and at a middle section between the secondary shaft first end and the secondary shaft second end.

8. The system of claim 7, the third shell bearing including a journal bearing.

9. The system of claim 5, the primary shaft including a primary shaft shoulder, and the system further comprising:
- a housing surrounding at least a portion of the primary shaft, the housing including a housing shoulder; and
- a primary shaft bearing assembly, including:
  - a primary shaft bearing between the primary shaft and the housing, the primary shaft bearing including an inner member and an outer member;
  - an inner loading member configured to apply an inner loading force on the inner member against the primary shaft shoulder; and
  - an outer loading member configured to apply an outer loading force on the outer member against the housing shoulder.

10. The system of claim 9, the primary shaft bearing including an angle contact bearing.

11. The system of claim 9, the inner loading member including a ring threadably connected to the primary shaft.

12. The system of claim 9, the housing being a first housing and the outer loading member including a second housing connected to the first housing.

13. The system of claim 9, the primary shaft bearing being a first primary shaft bearing, and the system further comprising a second primary shaft bearing between the inner loading member and the first primary shaft bearing.

14. A method for assembling a gyroscopic sensor, comprising:
- providing a MEMS-type gyroscope in a shell;
- extending a secondary shaft through the shell, a first shaft end of the secondary shaft being rigidly connected to a connection arm on a primary shaft, wherein extending the secondary shaft through the shell includes extending the secondary shaft through a first bearing between the shell and the connection arm and extending the secondary shaft through a second bearing opposite the shell from the first bearing, the second bearing being located at a second shaft end of the secondary shaft; and
- pre-loading the first bearing and the second bearing with a biasing element.

15. The method of claim 14, wherein pre-loading the first bearing and the second bearing includes applying a loading force to the second bearing with the biasing element, the loading force transferring through the shell to the first bearing and through the first bearing to the connection arm.

16. The method of claim 15, wherein the loading force places the shell under compression and the secondary shaft under tension.

17. The method of claim 15, further comprising securing a retaining member to the secondary shaft on the second shaft end, the retaining member contacting the biasing element to apply the loading force.

18. The method of claim 17, wherein securing the retaining member includes threading a nut onto the second shaft end.

19. The method of claim 14, wherein pre-loading the first bearing and the second bearing includes pre-loading the first bearing and the second bearing with a loading force of at least 500 N.

* * * * *